United States Patent

Namba et al.

[11] Patent Number: 5,161,150
[45] Date of Patent: Nov. 3, 1992

[54] OPTICAL RECORDING MEDIUM

[75] Inventors: Kenryo Namba, Tokyo; Masahiro Shinkai, Chiba; Sinichi Tezuka, Nagano; Tetsushi Inoue, Chiba; Toshiki Aoi; Suguru Takayama, both of Nagano, all of Japan

[73] Assignee: TDK Corporation, Tokyo, Japan

[21] Appl. No.: 486,843

[22] Filed: Mar. 1, 1990

[30] Foreign Application Priority Data

| Mar. 3, 1989 | [JP] | Japan | 1-051556 |
| Mar. 17, 1989 | [JP] | Japan | 1-065380 |
| Apr. 13, 1989 | [JP] | Japan | 1-093363 |
| Aug. 11, 1989 | [JP] | Japan | 1-209127 |
| Aug. 11, 1989 | [JP] | Japan | 1-209128 |
| Sep. 1, 1989 | [JP] | Japan | 1-227089 |
| Dec. 14, 1989 | [JP] | Japan | 1-324245 |
| Dec. 26, 1989 | [JP] | Japan | 1-336940 |
| Dec. 29, 1989 | [JP] | Japan | 1-342989 |

[51] Int. Cl.⁵ .................................. G11B 7/24
[52] U.S. Cl. .................... 369/275.4; 369/275.5
[58] Field of Search ............... 369/275.1, 275.4, 275.5, 369/284, 286, 288; 346/135.1, 76 L; 430/495, 945, 270, 271, 290

[56] References Cited

U.S. PATENT DOCUMENTS

| 4,268,575 | 5/1981 | Shinozaki et al. | 369/283 |
| 4,336,545 | 6/1982 | Howe et al. | 346/135.1 |
| 4,404,656 | 9/1983 | Cornet | 346/135.1 |
| 4,527,173 | 7/1985 | Gupta et al. | 346/135.1 |
| 4,711,815 | 12/1987 | Yoshiike et al. | 346/135.1 |
| 4,719,613 | 1/1988 | Hirose et al. | 369/275.1 X |
| 4,897,829 | 1/1990 | Ikoma et al. | 369/286 X |
| 4,965,153 | 10/1990 | Imataki et al. | 369/284 X |
| 4,990,388 | 2/1991 | Hamada et al. | 430/945 X |

FOREIGN PATENT DOCUMENTS

| 227981 | 7/1987 | European Pat. Off. |
| 240800 | 10/1987 | European Pat. Off. |

OTHER PUBLICATIONS

Patent Abstracts of Japan-vol. 8, No. 1 (P-246) Jan. 6, 1984, & JP-A-58 166548 (Hitachi Seisakusho K.K.) Oct. 1, 1983.

Patent Abstracts of Japan-vol. 12, No. 145 (M-693) May 6, 1988, & JP-A-62 267192 (Hitachi Maxell Ltd.) Nov. 19, 1987.

*Primary Examiner*—John W. Shepperd
*Assistant Examiner*—Tan Nguyen
*Attorney, Agent, or Firm*—Oblon, Spivak, McClelland, Maier & Neustadt

[57] ABSTRACT

An optical recording disk intended for use as an additionally recordable CD is provided. It has a substrate, a dye or recording layer on the substrate, and a reflective layer and a protective layer disposed on the recording layer in a close contact relationship. Recording is carried out by directing recording light to the recording layer to form a pit and reproduction is carried out by directing reproducing light to the pit. A layer containing a decomposition product of the dye or recording material, but substantially free of the substrate material is present at the interface between the substrate and the recording layer where the pit is formed.

11 Claims, 7 Drawing Sheets

OPTICAL RECORDING MEDIUM

This invention relates to an optical recording medium, and more particularly, to an optical recording medium of the write once type intended for compact disks.

BACKGROUND OF THE INVENTION

An additionally or fully recordable optical recording disk was proposed in accordance with the compact disk (generally known as CD) standard. See Nikkei Electronics, Jan. 23, 1989, No. 465, page 107; the Functional Dye Department of the Kinki Chemical Society, Mar. 3, 1989, Osaka Science & Technology Center; and SPIE, Vol. 1078, Optical Data Storage Topical Meeting, 80, 1989.

This disk has a dye layer, a reflective Au layer, and a protective layer disposed on a transparent resin substrate in this order. That is, the reflective layer is in close contact with the dye layer. This disk is specially adapted for CD application. A recording laser beam is directed to the dye layer of the optical recording disk whereupon the dye layer melts or decomposes due to light absorption while the substrate also softens. As a result, the dye material and the substrate material intermix at their interface to form a pit thereat which has a reduced reflectivity due to the phase difference of light.

As opposed to the prior art disk of the air sandwich structure wherein an air layer is provided on a dye layer of the disk in order to form a pit in the dye layer, the newly proposed disk is of the close contact type wherein the reflective layer is in close contact with the dye layer. The close contact type configuration can meet the total disk thickness of 1.2 mm required by the CD standard.

SUMMARY OF THE INVENTION

The inventors made extensive investigations on such optical recording disks. For an optical recording disk of the close contact type wherein a reflective layer is formed in close contact with a recording layer containing a dye, we have found that if the pit formed at the interface between the substrate and the recording layer contains a decomposition product of a recording layer material, typically dye, but does not contain the substrate material, then the disk is improved in various points including pit shape, noise upon recording and reproducing operation, and S/N ratio.

Therefore, an object of the present invention is to provide an optical recording disk of the close contact type which is improved in pit formation and achieves satisfactory recording and reproducing operation.

The present invention concerns an optical recording medium comprising a substrate of a material, a recording layer of a dye-containing recording material on the substrate, and a reflective layer and a protective layer disposed on the recording layer in a close contact relationship. Recording is carried out by directing recording light to the recording layer to form a pit and reproduction is carried out by directing reproducing light to the pit. According to the feature of the invention, a layer containing a decomposition product of the recording material, but substantially free of the substrate material is present at the interface between the substrate and the recording layer where the pit is formed.

Preferably, a space is formed at the interface between the pit in the recording layer and the overlying reflective layer.

In a preferred embodiment, the recording layer has a coefficient of extinction k of from 0.03 to 0.25 and an index of refraction n of from 1.8 to 4.0 at the wavelength of the recording and reproducing light, typically in the range of from 700 to 900 nm.

In a preferred embodiment, an unrecorded portion of the recording layer where no pit is formed has a reflectivity of at least 60% and a recorded portion of the recording layer where pits are formed has a reflectivity of up to 40% of that of the unrecorded portion when the reproducing light is directed to the pit from the substrate side.

The recording layer has a thickness of 500 to 1,500 Å where the recording light is directed thereto. Most often, it is formed by coating or vapor depositing a recording material which may consist of a dye or a mixture of two or more dyes.

Since the pit is formed of a material containing a decomposition product of the recording material, but substantially free of the substrate material, the pit has a well defined shape so that recording/reproducing operation may be carried out at a higher S/N ratio. The pit has a substantially reduced reflectivity as compared with the remaining recording layer or unrecorded portion, optical recording can be made to a sufficient level to reproduce with a CD player.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

Figure 1:
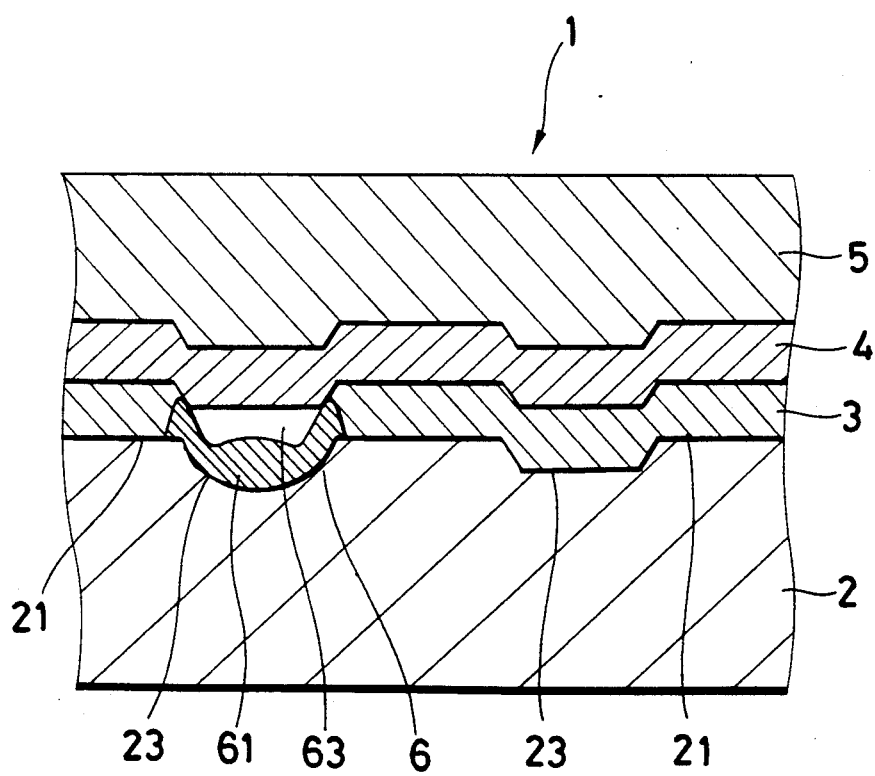
FIG. 1 is a fragmental cross-sectional view of an optical recording medium according to one embodiment of the present invention.

Referring to FIG. 1, there is illustrated in cross section an optical recording medium 1 according to one embodiment of the invention.

The optical recording medium 1 of the close contact type includes a substrate 2, a dye-containing recording layer 3 on the substrate, and a reflective layer 4 and a protective layer 5 on the recording layer 3 in close contact therewith.

Substrate

The substrate 2 is of disk shape having commonly used dimensions, for example, a thickness of about 1.2 mm and a diameter of about 80 or 120 mm according to the CD standard.

The substrate 2 is formed of a material which is substantially transparent to recording and reproducing light, typically a semiconductor laser beam having a wavelength of 600 to 900 nm, especially 700 to 800 nm, most often 780 nm. The material preferably has a transmittance of at least 80%. Then recording and reproducing operation can be made from the rear side of the substrate 2 remote from the recording layer 3. Typical materials are resins and glass. Preferably, a thermoplastic resin such as a polycarbonate, acryl, amorphous polyolefin, and TPX resin is used.

Light resistance is expected when the substrate material has an oxygen permeability of up to $5 \times 10^{-10}$ $cm^3 \cdot cm^{-2} \cdot s^{-1} \cdot (cmHg)^{-1}$ at 25° C. Better light resistance is expected when the substrate material has an oxygen permeability of up to $4 \times 10^{-10} cm^3 \cdot cm^{-2} \cdot s^{-1} \cdot (cmHg)^{-1}$ at 25° C. The oxygen permeability at 25° C. may be chosen to any desired value in the range of from substantially 0 to said upper limit.

The oxygen permeability is determined according to JIS Z 1707. More particularly, the oxygen permeability Q in $cm^3 \cdot cm^{-2} \cdot s^{-1} \cdot (cmHg)^{-1}$ and the oxygen permeability constant P in $cm^3 \cdot cm \cdot cm^{-2} \cdot s^{-1} \cdot (cmHg)^{-1}$ are determined according to the following equations:

$$P = (273/T) \cdot (V/A) \cdot L \cdot (1/p) \cdot (1/760) \cdot (dh/dt)$$

$$Q = (273/T) \cdot (V/A) \cdot (1/p) \cdot (1/760) \cdot (dh/dt)$$

wherein T=298 K,

V is a volume ($cm^3$) on a lower pressure side,

A is the area ($cm^2$) of the substrate,

L is the thickness (cm) of the substrate, which is typically set to be equal to 0.12 cm, p is an oxygen pressure (cmHg), and dh/dt is the gradient ($mmHg \cdot s^{-1}$) of a linear portion of a permeation curve.

The oxygen permeability Q of the substrate may be adjusted to the above-defined range by various approaches.

A first approach uses a substrate material having an oxygen barrier nature. In this case, glasses tempered by various strengthening methods may be used. Resins as listed below may also be used. In the following list of resins, the oxygen permeability constant P at 25° C. for a typical polymerization degree or composition is also shown. It will be understood that the oxygen permeability constant P divided by the typical substrate thickness of 0.12 cm is equal to the oxygen permeability Q of the substrate.

1) Amorphous polyolefin

Included are cyclic olefin polymers, typically random copolymers of a cyclic olefin component and an ethylenically double bond component. See Japanese Patent Application Kokai Nos. 273655/1988, 114643/1988, 218727/1988, 243108/1988, and 31844/1989.

$P = about\ 0.05 \times 10^{-10}\ cm^3 \cdot cm \cdot cm^{-2} \cdot s^{-1} \cdot (cmHg)^{-1}$ 2) High density polyethylene $P = about\ 0.4 \times 10^{-10} cm^3 \cdot cm \cdot cm^{-2} \cdot s^{-1} \cdot (cmHg)^{-1}$ 3) Polyvinyl alcohols
Polyvinyl alcohol $P = about\ 0.009 \times 10^{-10} cm^3 \cdot cm \cdot cm^{-2} \cdot s^{-1} \cdot (CmHg)^{-1}$ Ethylene-vinyl alcohol copolymer
$P = about\ (10^{-3}\ to\ 10^{-4}) \times 10^{-10} cm^3 \cdot cm \cdot cm^{-2} s^{-1} \cdot (cmHg)^{-1}$ 4) Polyvinyl chloride $P = about\ 0.05 \times 10^{-10}\ cm^3 \cdot cm \cdot cm^{-2} \cdot s^{-1} \cdot (cmHg)^{-1}$ 5) Polyvinylidene chloride $P = about\ 0.05 \times 10^{-10}\ cm^3 \cdot cm \cdot cm^{-2} \cdot s^{-1} \cdot (cmHg)^{-1}$ 6) Polyamides Nylon 6

$P = about\ 0.4 \times 10^{-10} cm^3 \cdot cm \cdot cm^{-2} \cdot s^{-1} \cdot (cmHg)^{-1}$ 7) Polyesters Polyethylene terephthalate $P = about\ 0.4 \times 10^{-10} cm^3 \cdot cm \cdot cm^{-2} \cdot s^{-1} \cdot (cmHg)^{-1}$ 8) Epoxy resins It is to be noted that resins commonly used for the substrate have the following values of oxygen permeability constant P.

Acrylic resin $P = about\ 1.2 \times 10^{-10} cm^3 \cdot cm \cdot cm^{-2} s^{-1} \cdot (cmHg)^{-1}$ Polycarbonate resin $P = about\ (1.5\ to\ 3) \times 10^{-10} cm^3 \cdot cm \cdot cm^{-2} \cdot s^{-1} \cdot (cmHg)^{-1}$ These P values give Q values in excess of $10 \times 10^{-10}$ $cm^3 \cdot cm^{-2} \cdot s^{-1} \cdot (cmHg)^{-1}$ for the thickness of 1.2 mm, resulting in less desired light resistance.

A second approach uses an oxygen permeable substrate material such as acryl resin and polycarbonate. Since these commonly used resins as such are less favorable as described above, a substrate of such a resin is formed with an oxygen barrier coating on at least one of its upper and lower major surfaces and optionally, on its radially outer and inner peripheral surfaces. The oxygen barrier coating used herein is a coated, sputtered, or plasma-polymerized film of any one of the above-listed low oxygen permeability constant resins. Gas phase deposited films of various glasses and transparent inorganic materials are also useful. The oxygen barrier coating is formed to a sufficient thickness to achieve an oxygen permeability constant Q within the above defined range.

On the surface of the substrate 2 where the recording layer 3 is formed, the upper surface in the illustrated embodiment, a groove 23 is preferably formed for tracking purposes. The tracking groove 23 preferably consists of continuous spiral turns. Typically, the groove 23 has a depth of 250 to 1,800 Å and a transverse distance of 0.3 to 1.1 μm, especially 0.4 to 0.6 μm. The adjoining turns 23 are separated by a land 21 having a transverse distance of 0.5 to 1.3 μm, especially 1.0 to 1.2 μm. With this groove configuration, tracking signals can be obtained without reducing the reflection level of the groove.

Where the groove is formed in the surface of the substrate, a provision is preferably made such that recording light is directed to a dye layer within the groove. That is, the optical recording medium of the invention is preferably of the groove recording mode. The groove recording mode allows the dye layer to have an increased effective thickness.

The tracking groove 23 may be provided with recesses or projections (not shown) for address signals. Although not shown in the figure, it is possible to form a resinous layer on the substrate, for example, by the 2P method and to form a tracking groove and addressing recesses or projections in the resinous layer. The resin material of which the resinous layer is formed is not particularly limited and may be properly selected from well-known resins commonly used in the 2P method. Most often, a radiation curable compound is selected.

Recording layer

The recording layer 3 is formed on the grooved substrate 2 from a dye or a compatible mixture of two or more dyes.

The recording layer preferably has a coefficient of extinction (the imaginary part of a complex index of refraction) k of from 0.03 to 0.25 at the wavelength of recording and reproducing light. With a coefficient of extinction k of less than 0.03, the recording layer can have a lower absorptivity so that it might become difficult to record with a commonly used power. A coefficient of extinction k of more than 0.25 can result in a drop of reflectivity to below 60%, often failing to reproduce according to the CD standard. Better results are obtained when k is in the range of from 0.04 to 0.20, especially from 0.05 to 0.15.

The recording layer preferably has an index of refraction (the real part of a complex index of refraction) n of from 1.8 to 4.0, more preferably 2.2 to 3.3 at the wavelength of recording and reproducing light. With an index of refraction n of lower than 1.8, the reflectivity would be reduced to below 60%, often failing to reproduce according to the CD standard. Few dyes are available which have an index of refraction n of higher than 4.0.

The recording layer is generally formed of a light absorbing dye. The light absorbing dye is not particularly limited insofar as it exhibits a maximum absorption in the wavelength range of from 600 to 900 nm, preferably from 700 to 900 nm. The light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squarilium dyes, chloconium dyes, and metal complex dyes alone or in admixture of two or more. Preferred among the cyanine dyes are cyanine dyes having an indolenine ring, especially a benzoindolenine ring.

The light absorbing dye may be mixed with a quencher. The quenchers used herein are preferably metal complexes, for example, acetylacetonato metal complexes, bisdithiol metal complexes such as bisdithio-α-diketone and bisphenyl. dithiol metal complexes, thiocatechol metal complexes, salicylaldehyde oxime metal complexes, and thiobisphenolate metal complexes. Amine quenchers such as amine compounds having a nitrogenous radical cation and hindered amines are also useful.

Further, an ionic combination of a dye cation and a quencher anion may be used as the light absorbing dye. The dyes used herein are preferably cyanine dyes having an indolenine ring. The quenchers used herein are preferably metal complex dyes such as bisphenyldithiol metal complexes.

Further information about the dyes, quenchers, and ionic combinations is found in the following references: Japanese Patent Application Kokai Nos.

| | | |
|---|---|---|
| 24692/1984 | 55794/1984 | 55795/1984 |
| 81194/1984 | 83695/1984 | 18387/1985 |
| 19586/1985 | 19587/1985 | 35054/1985 |
| 36190/1985 | 36191/1985 | 44554/1985 |
| 44555/1985 | 44389/1985 | 44390/1985 |
| 47069/1985 | 20991/1985 | 71294/1985 |
| 54892/1985 | 71295/1985 | 71296/1985 |
| 73891/1985 | 73892/1985 | 73893/1985 |
| 83892/1985 | 85449/1985 | 92893/1985 |
| 159087/1985 | 162691/1985 | 203488/1985 |
| 201988/1985 | 234886/1985 | 234892/1985 |
| 16894/1986 | 11292/1986 | 11294/1986 |
| 16891/1986 | 8384/1986 | 14988/1986 |
| 163243/1986 | 210539/1986 | 30088/1987 |
| 32132/1987 | 31792/1987 | |

Japanese Patent Application No. 54013/1985, and "Chemistry of Functional Dyes," CMC Publishing K. K., 1981, pages 74–76.

The quencher may be added either separately from the light absorbing dye or in the form of a bonded combination with the light absorbing dye. Preferably, the quencher is added in an amount of up to 1 mol, more preferably 0.05 to 0.5 mol per mol of the total light absorbing dyes because a further improvement in light resistance is expectable.

In the practice of the invention, one having k and n within the above-defined ranges is preferably selected from the light absorbing dyes, dye-quencher mixtures, and dye-quencher bonded combinations. It is also possible to newly set up a molecular design and synthesize such a dye or analogue according to the design.

The coefficient of extinction k of a dye with respect to recording and reproducing light generally varies over the range of from 0 to 2 depending on its skeleton and substituent. In selecting a dye having a coefficient of extinction k of 0.03 to 0.25, for example, some limitations are imposed on its skeleton and substituent. Then the coating solvent is limited as the case may be. Sometimes, the dye cannot be applied to certain substrates or the dye cannot be deposited from a gas phase. Further, determining a new molecular design requires an increased amount of labor for design and synthesis.

Through experiments, the inventors have found that a dye layer formed of a mixture of at least two dyes has a coefficient of extinction k which is determined from the coefficients of extinction k of the layers consisting of the respective dyes alone, in substantial proportion to the ratio of the dyes. Thus it is possible to form the recording layer from a compatible mixture of two or more dyes.

Most mixtures of dyes have a coefficient of extinction k substantially proportional to the mixing ratio of dyes. More particularly, a mixture of i types of dye has a coefficient of extinction k substantially equal to $\Sigma C_i k_i$ wherein the i-th dye has a coefficient of extinction $k_i$ and a mixing fraction $C_i$. Thus a dye layer having k=0.03 to 0.25 may be formed by mixing dyes having different k in a controlled mixing ratio. This, in turn, means that the dyes used herein can be selected from a wider variety.

The same principle as above can be applied to an improvement in wavelength dependency. In general, a semi-conductor laser produces a beam having a wavelength width of ±10 nm. Commercial CD players require a reflectivity of at least 70% in the wavelength range between 770 nm and 790 nm. Generally, the coefficient of extinction k of a dye is largely dependent on a wavelength. Some dyes can have an adequate coefficient k at 780 nm, but a largely deviated coefficient k at 770 or 790 nm. In this case, a second dye may be mixed with a first dye to form a mixture which has adequate values of k and n over the wavelength range of 780±10 nm.

This eliminates the limitation of film formation such as limitation of a coating solvent and allows for the use of a readily synthesizable, inexpensive dye, a dye having excellent properties, or a sparingly soluble dye.

Where the recording layer is formed of a mixture of dyes, the dyes may be selected from those having an index of refraction n=1.6 to 6.5 and a coefficient of extinction k =0 to 2.

In determining n and k, a sample is prepared by forming a recording layer on a given transparent substrate to a thickness of about 400 to 800 Å. Then the reflectivity of the sample is measured through the substrate or from the recording layer side. Reflectivity is measured in a mirror reflection mode (of the order of 5°) using light having the recording/reproducing wavelength. The transmittance of the sample is also measured. The index of refraction n and coefficient of extinction k may be calculated from these measurements according to K. Ishiguro, "Optics," Kyoritsu Publishing K. K., pages 168-178.

The recording layer 3 preferably has a thickness of 500 to 2,000 Å. Outside the range, reflectivity can be lowered below the permissible level to reproduce according to the CD standard.

It is also possible to mix the above-mentioned light absorbing dye or light absorbing dye-quencher combination with an additional dye having a maximum absorption at a wavelength of 350 to 600 nm, especially 350 to 550 nm. The additional dye should preferably exhibit substantially no absorption at an operating wavelength of 700 to 900 nm and has an index of refraction n of up to 2.8 and a coefficient of extinction k of up to 0.05. The additional dye of such optical nature will selectively bleach out upon receipt of light due to catalysis of the light absorbing dye, contributing to an improvement in the life of the light absorbing dye.

Such light bleaching dyes are preferably azo dyes including mono-, bis- and trisazo dyes.

Preferred examples of the azo dyes are given below.

A1 Acid Yellow 25 (C.I. 18835, λmax 392 nm)
A2 Acid Yellow 29 (C.I. 18900, λmax 407 nm)
A3 Acid Yellow 34 (C.I. 18890, λmax 408 nm)
A4 Acid Yellow 36 (C.I. 13065, λmax 414 nm)
A5 Acid Yellow 40 (C.I. 18950, λmax 412 nm)
A6 Acid Yellow 42 (C.I. 22910, λmax 410 nm)
A7 Palatine Fast Yellow BLN (C.I. 19010, λmax 440 nm)
A8 Acid Yellow 65 (C.I. 14170, λmax 414 nm)
A10 Flavazin L (Acid Yellow 11) (C.I. 18820, λmax 407 nm)
A11 Acid Alizarin Violet N (C.I. 15670, λmax 501 nm)
A12 Acid Orange 8 (C.I. 15575, λmax 490 nm)
A13 Acid Orange 51 (C.I. 26550, λmax 446 nm)
A14 Methyl Orange (Acid Orange 52) (C.I. 13025, λmax 505 nm)
A15 Acid Orange 62 (C.I. 22870, λmax 424 nm)
A16 Acid Orange 74 (C.I. 18745, λmax 455 nm)
A17 Acid Red 183 (C.I. 18800, λmax 494 nm)
A18 Fast Garnet GBC base (C.I. 11160, λmax 360 nm)
A19 Fast Brown B (Solvent Red 3) (C.I. 12010, λmax 408 nm)
A20 Fast Brown RR (Solvent Brown 1) (C.I. 11785, λmax 451 nm)
A21 Direct Red L (C.I. 23500, λmax 500 nm)
A22 Bismark Brown R (C.I. 21010, λmax 468 nm)
A23 Bismark Brown Y (C.I. 21000, λmax 457 nm)
A24 Brilliant Yellow (C.I. 24890, λmax 397 nm)
A25 Chrysoidin, Basic Orange 2 (C.I. 11270, λmax 449 nm)
A26 Conga Red (λmax 497 nm)
A27 Sudan I (λmax 476 nm)
A28 Sudan II (λmax 493 nm)
A29 Sudan Orange G (λmax 388 nm)
A30 Acid Yellow 23 (C.I. 19140, λmax 425 nm)
A31 6-butoxy-2,6-diamino 3,3'-azodipyridine (λmax 433 nm)
A32 Fast Corinth V salt (azoic Diazo No. 39) (C.I. 37220, λmax 356 nm)
A33 Fast Black K salt (azoic Diazo No. 38) (C.I. 37190, λmax 457 nm)
A34 Fast Dark Blue R salt (azoic Diazo No. 51) (C.I. 37195, λmax 425 nm)

In addition, the following azoic dyes and diazo compounds are also useful.

A35 Fast Blue B salt (azoic Diazo No. 48) (C.I. 37235, λmax 371 nm)
A36 Fast Blue BB salt (azoic Diazo No. 20) (C.I. 37175, λmax 395 nm)
A37 Fast Blue RR salt (azoic Diazo No. 24) (C.I. 37155, λmax 393 nm)

These light bleach-out dyes having shorter wavelength absorption properties may be mixed in amounts of about 0.01 to 0.4 mol, especially about 0.02 to 0.2 mol per mol of the light absorbing dye.

The recording layer is formed from any of the above-mentioned light absorbing dyes or mixtures thereof with light bleach-out dyes as mentioned above although the recording material may further contain a resin.

It is not critical how to form the recording layer 3. In the practice of the invention, the recording layer is preferably formed by coating because of many advantages including wider selection of the applicable dye, freedom of medium design, and ease of manufacture. To form the recording layer by coating, the solvent may be selected from ketones, esters, ethers, aromatics, alkyl halides, and alcohols. Spin coating is a typical coating technique.

Alternatively, the recording layer 3 may be a vacuum deposited film of a dye. The dyes used herein include phthalocyanone dyes, naphthalocyanine dyes, anthraquinone dyes, azo dyes, triphenylmethane dyes, pyrylium dyes, thiapyrylium dyes, squarilium dyes, chloconium dyes, and metal complex dyes alone or in admixture of two or more, with the phthalocyanine and naphthalocyanine dyes being preferred. These sublimatable dyes will sometimes improve the pit shape and reduce jitter.

Reflective layer

The reflective layer 4 is applied to the recording layer 3 in direct contact therewith.

The reflective layer may be formed from any desired high reflectivity material, for example, Au, Al—Mg alloys, Al—Ni alloys, Ag, Pt and Cu. Among them, Au, Al—Mg alloys, and Al—Ni alloys are preferred for higher reflectivity. However, gold does not fully adhere to the underlying dye layer. For an increased bond between the reflective layer and the dye layer, Al—Mg and Al—Ni alloys are preferred. Preferred Al—Mg alloys contain about 3 to 7% by weight of magnesium, and preferred Al-Ni alloys contain about 3 to 4% by weight of nickel.

The reflective layer 4 preferably has a thickness of at least 500 Å. It can be formed by evaporation or sputtering. Although no upper limit is generally imposed on the thickness of the reflective layer, a thickness of up to 1,000 Å is preferred for manufacturing cost and time. Within this thickness range, the reflectivity of an unrecorded portion of the medium through the substrate can be at least 60%, especially at least 70%.

Protective layer

The protective layer 5 is formed on the reflective layer 4.

The protective layer may be formed from any desired resin material such as a UV-curable resin, usually to a thickness of about 10 to 100 μm. The protective layer may be either a layer or a sheet.

The protective layer is preferably prepared by coating a composition of a radiation-curable compound and a photo-polymerization sensitizer and curing the coating with radiation.

Preferably, the protective layer has a hardness in the range of H to 8H, especially 2H to 7H in pencil hardness at 25° C. according to JIS K-5400. This hardness range leads to a substantial reduction of jitter. In addition, the protective layer will not separate from the underlying reflective layer during shelf storage under high-temperature, high-humidity conditions or varying temperature and humidity conditions. More specifically, jitter can increase if the protective layer is softer than pencil hardness H. A protective layer harder than 8H becomes brittle and difficult to form or does not fully adhere to the underlying reflective layer.

The radiation curable compounds used in forming the protective layer include oligoester acrylates.

The oligoester acrylates are oligoester compounds having at least two acrylate or methacrylate groups. Preferred oligoester acrylates have a molecular weight of 1,000 to 10,000, more preferably 2,000 to 7,000 and a degree of polymerization of 2 to 10, more preferably 3 to 5. Most preferred are polyfunctional oligoester acrylates having 2 to 6, especially 3 to 6 acrylate or methacrylate groups.

These polyfunctional oligoester acrylates are commercially available under the trade names of Aronix M-7100, M-5400, M-5500, M-5700, M-6250, M-6500, M-8030, M-8060, M-8100, etc. from Toa Synthetic K. K. They are represented by the following formulae.

In the formulae, A is an acrylate or methacrylate group, M is a dihydric alcohol residue (for example, ethylene glycol, diethylene glycol, 1,6-hexane glycol, and bisphenol-A), N is a dibasic acid residue (for example, terephthalic acid, isophthalic acid, adipic acid, and succinic acid), and letter n is a number of 1 to 10, especially 2 to 5. The polyfunctional oligoester acrylates of formula (I) are especially preferred.

The oligoester acrylates may be used alone or in combination with another radiation-curable compound. In the latter case, the oligoester acrylate is preferably present in an amount of at least 20% by weight in a mixture thereof with the radiation-curable compound.

The radiation-curable compounds used in combination with the oligoester acrylates include monomers, oligomers, and polymers having incorporated in their molecule a group capable of crosslinking or polymerization upon exposure to radiation, for example, an acrylic double bond as given by acrylic acid, methacrylic acid and their esters which are sensitive to an ionization energy and capable of radical polymerization, an allyl double bond as given by diallyl phthalate, and an unsaturated double bond as given by maleic acid and maleic derivatives. They are preferably polyfunctional, especially at least trifunctional.

The radiation-curable monomers are usually compounds having a molecular weight of lower than 2,000 and the oligomers are those having a molecular weight of 2,000 to 10,000.

Examples include styrene, ethylacrylate, ethylene glycol diacrylate, ethylene glycol dimethacrylate, diethylene glycol diacrylate, diethylene glycol methacrylate, 1,6-hexaneglycol diacrylate, 1,6-hexaneglycol dimethacrylate, and more preferably pentaerythritol tetraacrylate (and methacrylate), pentaerythritol triacrylate (and methacrylate), trimethylolpropane triacrylate (and methacrylate), trimethylolpropane diacrylate (and methacrylate), acryl modified products of urethane elastomers (e.g., Nippolane 4040 available from Nippon Polyurethane K. K.), and derivatives thereof having a functional group such as COOH incorporated therein, acrylates and methacrylates of phenol ethylene oxide adducts, and compounds having a pentaerythritol fused ring represented by the following general formula and having an acryl or methacryl group or ε-caprolactone-acryl group attached thereto:

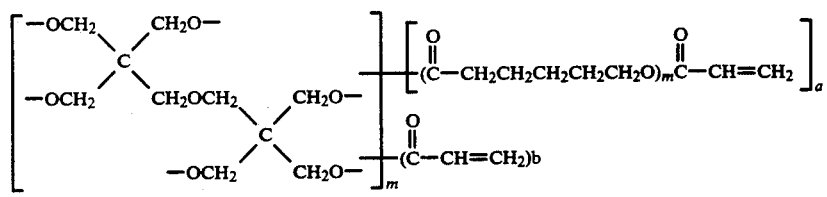

for example, a compound wherein m=1, a=2, and b=4 (to be referred to as special pentaerythritol condensate A, hereinafter), a compound wherein m=1, a=3, and b=3 (to be referred to as special pentaerythritol condensate B, hereinafter), a compound wherein m=1, a=6, and b=0 (to be referred to as special pentaerythritol condensate C, hereinafter), and a compound wherein m=2, a=6, and b=0 (to be referred to as special pentaerythritol condensate D, hereinafter).

Also included are special acrylates represented by the following general formulae:

1)
(Special acrylate A)

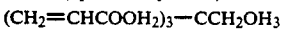
2)
(Special acrylate B)

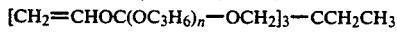
3)
(Special acrylate C)

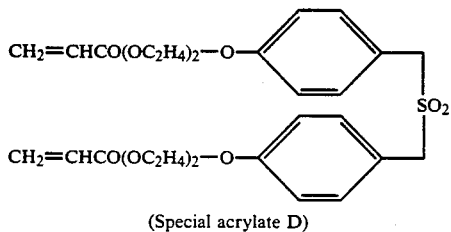
4)
(Special acrylate D)

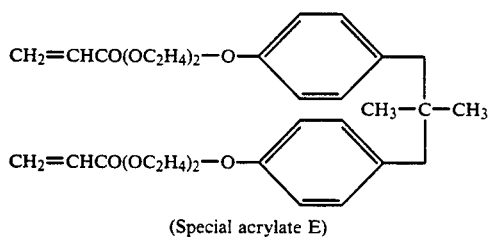
5)
(Special acrylate E)

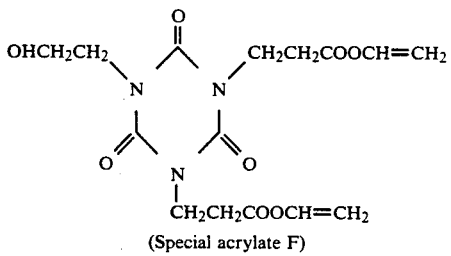
6)
(Special acrylate F)

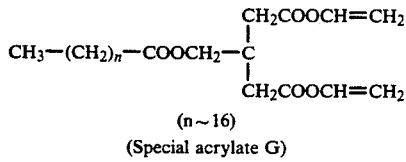
7)
(n~16)
(Special acrylate G)

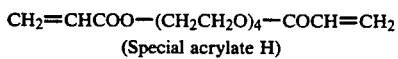
8)
(Special acrylate H)

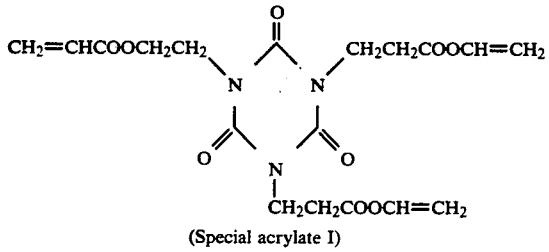
9)
(Special acrylate I)

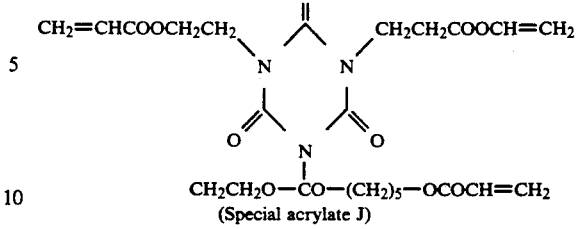
10)
(Special acrylate J)

Examples of the radiation-curable oligomers include acryl modified urethane elastomers and their derivatives having a functional group such as COOH incorporated therein.

In addition to or instead of the above-mentioned compounds, radiation-curable compounds obtained by modifying thermoplastic resins so as to be radiation sensitive may be used. Examples of such radiation-curable resins include thermoplastic resins having incorporated in their molecule a group capable of crosslinking or polymerization upon exposure to radiation, for example, an acrylic double bond as given by acrylic acid, methacrylic acid and their esters having a radically polymerizable unsaturated double bond, an allyl double bond as given by diallyl phthalate, and an unsaturated bond as given by maleic acid and maleic derivatives.

Examples of the thermoplastic resins which can be modified to be radiation curable include vinyl chloride copolymers, saturated polyester resins, polyvinyl alcohol resins, epoxy resins, phenoxy resins, and cellulosic derivatives.

Other resins which can be modified to be radiation curable include polyfunctional polyesters, polyether ester resins, polyvinyl pyrrolidone resins and derivatives thereof (e.g., PVP olefin copolymers), polyamide resins, polyimide resins, phenolic resins, spiroacetal resins, and acrylic resins containing at least one acryl ester and methacryl ester containing a hydroxyl group as a polymerizing component.

The protective layer of such a radiation-curable compound preferably has a thickness of from about 0.1 to 30 μm, more preferably from about 1 to 10 μm. A protective layer of thinner than 0.1 μm is often difficult to form uniformly and insufficient as a moisture barrier in a humid atmosphere so that the underlying recording layer becomes less durable. Jitter prevention also becomes insufficient. A protective layer thicker than 30 μm tends to invite distortion of the overall recording medium and cracking of the protective layer itself due to shrinkage upon curing.

The protective layer may be formed by any desired well-known technique, for example, spinner coating, gravure coating, spraying, dipping, and combinations thereof. The conditions under which the protective layer is formed may be determined by taking into account the viscosity of a coating composition, the desired coating thickness, and other factors without undue experimentation.

The radiation to which the coating is exposed may be ultraviolet (UV) radiation, electron radiation, or the like, with UV being preferred.

Where UV is used, a photopolymerization sensitizer is generally added to the radiation-curable compounds. The photopolymerization sensitizer used herein is preferably a compound of formula (III) shown below. Addition of this compound to a polyfunctional oligoester acrylate facilitates formation of a film having a hardness within the above-defined range and excellent physical properties. The resulting film firmly adheres to the underlying reflective layer or adhesive layer (to be described later) and improves durability and humidity resistance.

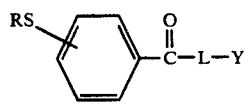

In formula (III), R is a substituted or unsubstituted alkyl group having 1 to 4 carbon atoms, for example, a methyl, ethyl, propyl, and butyl group, with the methyl and ethyl groups being preferred;

L is a substituted or unsubstituted alkylene group having 1 to 3 carbon atoms, for example,

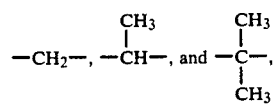

with the last one being preferred; and

Y is a heterocyclic group, for example, a morpholino, 2-morpholino, piperidino, 4-piperidinyl, 2-pyridyl, 2-quinolyl, 1-pyrrolidinyl, 1-pyrrolyl, 2-thienyl, and 2-furyl group, with the morpholino group being preferred.

In formula (III), RS. may be attached to the benzene ring at any of its substitutable positions, but preferably at the para-position with respect to the -CO-L-Y group.

Most preferred among the compounds of formula (III) is the following compound A.

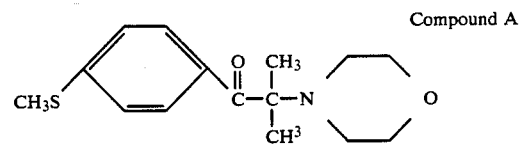

Compound A

This compound A is commercially available as IRGA-CURE 907 from Japan Ciba Geigy K.K.

The compounds of formula (III) act as photopolymerization initiators or sensitizers upon radiation curing.

These compounds are preferably contained in an amount of 0.1 to 20% by weight, more preferably 1 to 10% by weight in the organic protective coating composition. Less than 0.1% is insufficient to initiate or sensitize photo-polymerization whereas in excess of 20%, some initiator or sensitizer is left unconsumed which will penetrate into and adversely affect the recording layer.

As the photopolymerization sensitizer, any well-known compounds may be used in combination with the compounds of formula (III) if desired. Such known compounds include benzoins such as benzoin methyl ether, benzoin ethyl ether, α-methylbenzoin, and α-chlorodeoxybenzoin, ketones such as benzophenone, acetophenone, and bisdialkylaminobenzophenone, quinones such as anthraquinone and phenanthraquinone, and sulfides such as benzyl disulfide and tetramethylthiuram monosulfide.

A coating containing a radiation-curable compound and a photopolymerization sensitizer as defined above may be cured with radiation by any well-known methods. For example, UV lamps such as xenon discharge lamps and hydrogen discharge lamps are used. If desired, electron radiation may be used.

On the protective film, an additional protective film in the form of a resinous layer or sheet may be formed.

Jitter preventing film

A jitter preventing film may be provided on the reflective layer 4 and/or between the recording layer 3 and the reflective layer 4, though not shown in FIG. 1.

The jitter preventing film may be a plasma-polymerized film or an inorganic thin film. Although the jitter preventing film formed on the reflective layer can also function as the protective film, it is also contemplated to form another protective layer (as defined above) on the jitter preventing film.

The jitter preventing film preferably has a thickness of at least 0.05 $\mu$m, more preferably 0.1 to 10 $\mu$m. Too thin films are ineffective in preventing jitter whereas too thick films fail to meet the CD standard and provide no additional benefit at an increased cost.

The plasma-polymerized film may be any of well-known plasma-polymerized films. Most often, it is based on carbon and may contain H, O and a halogen such as Cl and F or other elements such as Si and N. The source gases and conditions used in plasma polymerization may be chosen according to well-known techniques. Since the plasma-polymerized film is substantially transparent, it may be formed either above or below the reflective layer.

The inorganic thin film may be formed from various inorganic compounds such as oxides, nitrides, carbides, silicides and mixtures thereof.

Adhesive layer

An adhesive layer may be provided between the recording layer 3 and the reflective layer 4 in close contact with both the layers, though not shown in FIG. 1.

The adhesive layer preferably contains a hydrolysis condensate of an organic silicate compound, organic titanate compound, organic aluminate compound, or organic zirconate compound or a hydrolysis condensate of a Si, Ti, Al or Zr halide.

The organic titanate compounds used herein may be selected from various well-known compounds, for example, alkyltitanate esters, substituted alkyltitanate esters, alkenyltitanate esters, and substituted alkenyltitanate esters.

The organic zirconate compounds used herein may be selected from various well-known compounds, for example, alkylzirconate esters, substituted alkylzirconate esters, alkenylzirconate esters, and substituted alkenylzirconate esters.

The organic aluminate compounds used herein may be selected from various well-known compounds, for example, aluminum alkoxides and aluminum chelates.

Among these compounds, compounds having the following structural formulae are particularly preferred.

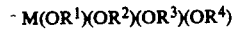

In the formulae, M is Ti or Zr, and $R^1$, $R^2$, $R^3$, and $R^4$ are independently selected from the class consisting of a hydrogen atom, a substituted or unsubstituted alkyl group, and a substituted or unsubstituted alkenyl group. Preferably, at least two of $R^1$ to $R^4$ are alkyl or alkenyl groups rather than hydrogen atoms. The substituted or unsubstituted alkyl or alkenyl groups preferably have 2 to 18 carbon atoms. The substituents on the alkyl or alkenyl groups include a carboxyl group, an alkylcarboxyl group, a substituted amino group such as a di(hydroxyalkyl)amino group, a hydroxyl group, and an alkyloxycarbonyl group.

Illustrative examples of the organic titanate compounds are given below.
T1 Tetraethyl titanate
T2 Tetrapropyl titanate
T3 Tetraisopropyl titanate
T4 Tetra(n-butyl) titanate
T5 Tetra(isobutyl) titanate
T6 Tetra(sec-butyl) titanate
T7 Tetra(tert-butyl) titanate
T8 Tetra(2-ethylhexyl) titanate
T9 Tetrastearyl titanate
T10 Hydroxytitanium stearate
T11 Isopropoxytitanium stearate
T12 Hydroxytitanium oleate
T13 Isopropoxytitanium oleate
T14 Di-i-propoxy bis(acetylacetone) titanate
T15 Di-n-butoxy bis(triethanolamine) titanate
T16 Dihydroxy bis(lactic acid) titanate
T17 Tetraoctylene glycol titanate
T18 Di-i-propoxy bis(ethyl acetoacetate) titanate Illustrative examples of the organic zirconate compounds include tetra-n-propyl zirconate, tetra-i-propyl zirconate, tetra-n-butyl zirconate, tetra-i-butyl zirconate, zirconium tetraacetylacetonate, zirconium 2-ethylhexoate, zirconium naphthenate, and diacetate zirconate.

Illustrative examples of the organic aluminate compounds include aluminum isopropylate, mono-sec-butoxy aluminum diisopropylate, aluminum sec-butyrate, ethylaceto-acetate aluminum diisopropylate, and aluminum ethylaceto-acetate.

Illustrative examples of the organic silicate compounds include alkyl silicates, especially tetra(lower alkyl) silicates such as tetramethyl silicate and tetraethyl silicate.

The organic titanate compound, organic zirconate compound, organic aluminate compound, or organic silicate compound may form an oligomer or colloidal condensed oxide in a coating composition.

The halides used herein include silicon halides, especially silicon tetrachloride.

An adhesive layer is formed from the organic titanate compound, organic zirconate compound, organic aluminate compound, organic silicate compound or halide as enumerated above by diluting the compound with a solvent such as water, alcohol, hexane, and benzene or a solvent mixture, applying the dilution onto the recording or dye layer, and allowing the coating to stand for hydrolysis to take place, thereby forming a condensate. The application of the adhesive layer is not particularly limited and spin coating is a typical application method.

The adhesive layer preferably has a thickness of about 10 to 300 Å, more preferably 20 to 100 Å. Thinner layers are optically non-uniform and offer less bond strength whereas thicker layers can alter optical properties, that is, adversely affect reflectivity and modulation factor.

Operation

Recording or additional recording may be carried out on the optical recording medium 1 of the above-described construction by directing recording light having a wave-length of 780 nm, for example, in pulse form to the recording layer 3 in the groove 23 through the substrate 2 to form a pit 6. The recording layer 3 absorbs light so that it is heated while the substrate 2 is heated at the same time. As a result, the recording material, typically dye melts or decomposes near the interface between the substrate 2 and the recording layer 3, applying a pressure to the interface between the substrate 2 and the recording layer 3 to deform the bottom and side walls of the groove 23.

The melted or decomposed product of the recording material finds no place to go because of the tightly sealed relationship. A portion of the melted or decomposed product climbs over the land 21 and the majority remains on the bottom of the groove 23. As a result, the decomposed product of the recording material forms a layer 61 which covers the groove 23 over its bottom to the boundary between the groove 23 and the land 21. The decomposed layer 61 consists essentially of the decomposed product of the recording material or a mixture of the decomposed product of the recording material and the recording material, but does not substantially contain the substrate material.

The decomposed layer 61 generally has a thickness of about 30 to 90% of the thickness of the recording layer 3.

The pit 6 generally includes an empty space 63 which is formed above the decomposed layer 61 and at the interface between the original recording layer 3 and the reflective layer 4. The space 63 generally has a thickness of about 10 to 70% of the thickness of the recording layer 3. Therefore, the pit 6 consists of the decomposed layer 61 and the space 63.

During the recording step described above, the substrate 2 does not undergo deformation in some cases, but in most cases, the substrate 2 is depressed into a recess at the pit 6 under the pressure induced upon heating. The depression of the substrate 2 is increased with the size of the pit 6 and is generally 0 to 300 Å deep.

In some cases, a fraction of the recording material or its decomposed product in an extremely thin film form can remain adhered to the reflective layer 4 above the space 63.

In this way, the layer 61 substantially free of the substrate material is formed in the pit 6 at the interface between the substrate 2 and the recording layer 3.

The inventors have found that the pit 6 between the substrate 2 and the recording layer 3 does not substantially contain the substrate material. An optical recording disk was fabricated by applying a recording layer 3, a reflective layer 4, and a protective layer 5 on a substrate 2 under predetermined conditions, and then recorded by directing a laser beam. Several samples were cut out from the disk, and the protective and reflective layers 5 and 4 were removed therefrom. The exposed surface of the substrate 2 was cleaned with methanol under two sets of cleaning conditions. One set of cleaning conditions was a mild cleaning wherein the sample was mildly shaken in the alcoholic solvent, and the other set was an intense ultrasonic cleaning. After cleaning, an output image of the cleaned substrate surface was taken under a scanning tunneling microscope (STM). The thickness of the groove in the substrate was measured from the output image.

In the samples subjected to ultrasonic cleaning, the pit 6 was flat or depressed. In the samples subjected to mild cleaning, the pit 6 was raised on the substrate 2. These observations suggest that the raised pit 6 in the mildly cleaned samples resulted from decomposition of the recording material, typically dye upon receipt of recording layer to form a reflective layer having a thickness of 1,000 Å. Further, a UV-curable resin composition containing an oligoester acrylate was coated on the reflective layer and UV cured to form a protective layer having a thickness of 10 μm, completing an optical recording disk sample.

The dyes A1 and A2 used to form the recording layer have the following structural formulae.

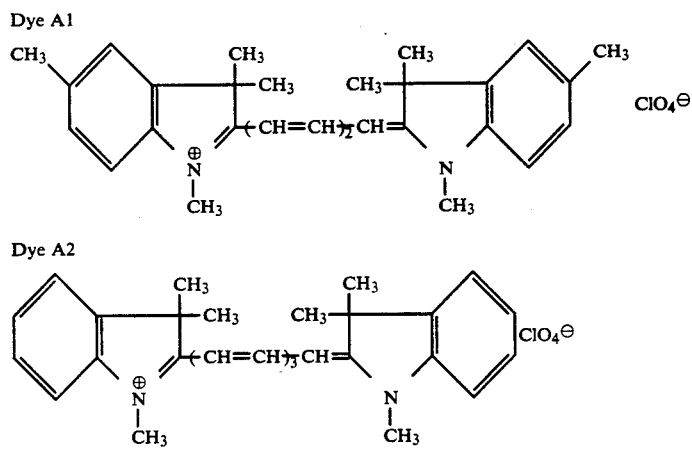

heat, that is, it is a layer of a decomposed product of the recording material having a reduced solubility.

In fact, the residue after mild cleaning was analyzed by liquid chromatography, absorption spectroscopy, Fourier transform infrared spectroscopy (FTIR), or MAS to find that the decomposed product is present, but the substrate material is absent at the pit bottom.

The pit forming mechanism occurring in the present invention is different from the pit forming mechanism disclosed in Nikkei Electronics, Jan. 23, 1989, No. 465, page 107, that a recording laser beam is directed to a dye layer whereupon the dye layer melts or decomposes and the substrate also softens due to light absorption so that the dye material and the substrate material intermix at their interface to form a pit thereat.

The pit formed of the decomposed product of the recording material, but substantially free of the substrate material is well defined in shape, resulting in an increased S/N ratio.

It is to be noted that the recording light has a power of about 5 to 9 mW while the substrate is rotated at a linear velocity of about 1.2 to 1.4 m/sec.

After the pit 6 is formed in this way, reproducing light having a wavelength of 780 nm and a power of about 0.1 to 1.0 mW is directed to the pit 6 through the substrate 2. The pit causes a phase difference to reduce the reflectivity by 60% or more. In turn, the remaining recording layer, that is, the unrecorded portion maintains a high reflectivity of at least 60%, especially at least 70%. This differential reflectivity enables reproduction according to the CD standard.

EXAMPLE

Examples of the present invention are given below by way of illustration and not by way of limitation.

EXAMPLE 1

A recording layer containing a mixture of dyes was formed on a polycarbonate substrate having a continuous spiral groove and a diameter of 120 mm and a thickness of 1.2 mm. Gold was vacuum deposited on the The recording layer was formed by spin coating a coating solution while the substrate was rotated at 500 r.p.m. The coating solution was a 1.5 wt. % methanol solution of dyes A1 and A2. The dye layer was 1,300 Å thick at the end of drying.

The dyes and their proportion in the recording layer are shown in Table 1 together with the index of refraction (n) and coefficient of extinction (k) of the recording layer.

The index of refraction (n) and coefficient of extinction (k) of the recording layer were determined by applying a solution of a dye onto a test substrate to a dry thickness of 600 Å and measuring the n and k of the resulting recording layer. The measurement was made according to K. Ishiguro, "Optics," Kyoritsu Publishing K. K., pages 168-178. In the measurement of the recording layer of dyes A1 and A2, the solvent was methanol and the test substrate was a polycarbonate substrate.

TABLE 1

| Sample No. | Dye (wt %)       | n   | k    |
|------------|------------------|-----|------|
| 1          | A1 (90) + A2 (10) | 2.4 | 0.10 |

CD signals were recorded in the sample disk using a laser beam having a wavelength of 780 nm and a power of 7 mW. Then reproduction was carried out with a commercial CD player. Disk sample No. 1 permitted satisfactory reproduction at a high S/N ratio.

Two sample pieces were cut out from disk sample No. 1. The protective and reflective layers were removed from the samples and then the exposed substrate surface was cleaned for 2 minutes with methanol under two different sets of conditions. Sample No. 1-1 was mildly cleaned by lightly shaking the sample in methanol. Sample No. 1-2 was intensely cleaned by ultrasonic cleaning.

After cleaning, a gold film of 100 Å thick was formed on the substrate surface by sputtering. The surface state of the samples was imaged using a scanning tunneling microscope (STM) purchased from Toyo Technica K. K.

Figure 2:
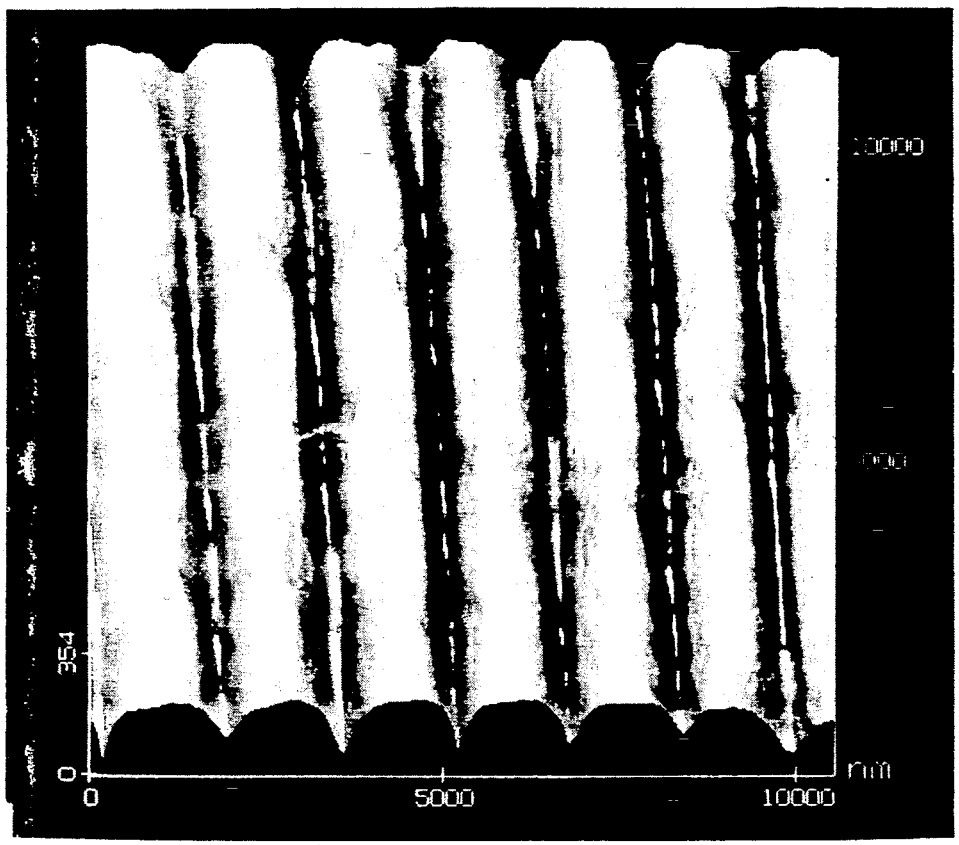
FIGS. 2 and 3 are photographs under a scanning tunnel microscope of the grooved substrate surface of optical recording disk pieces in Example 1 from which the recording layer has been partially or completely washed away.
Figure 3:
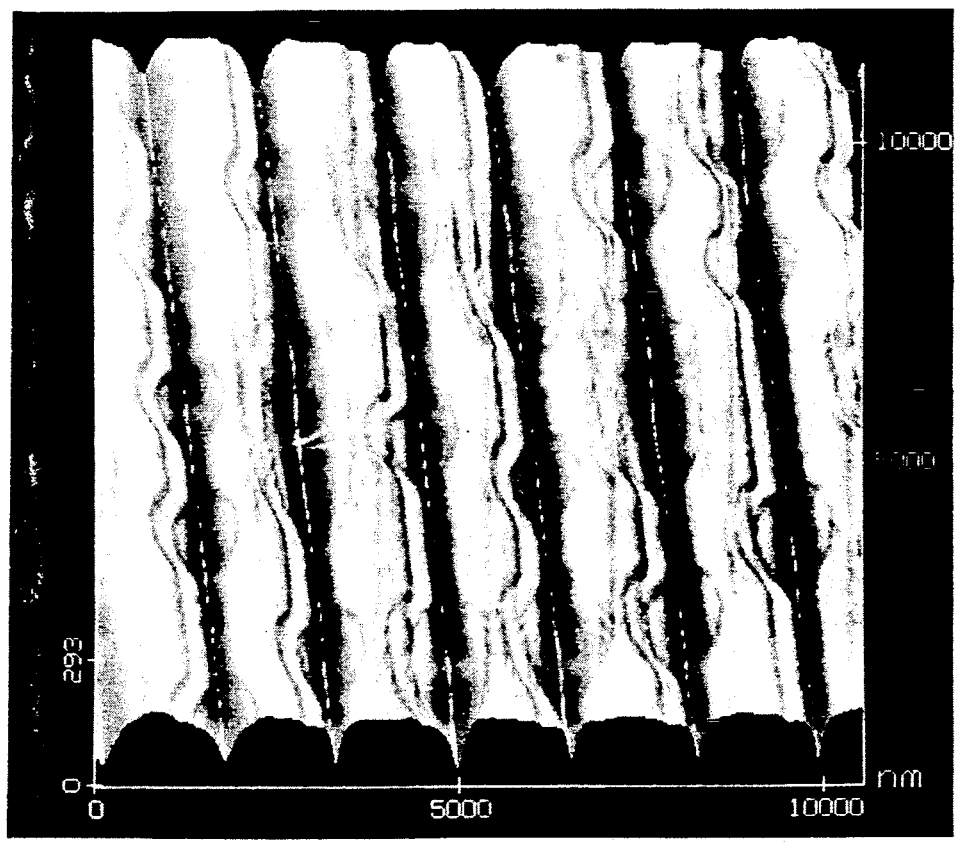

FIGS. 2 and 3 are STM images of sample Nos. 1-1 and 1-2, respectively. As seen from these images, sample No. 1 subject to mild cleaning had a film of a substantial thickness at pits in the groove. Sample No. 1-2 subject to intense cleaning had a film of a substantially uniform thickness left in the groove.

Figure 4:
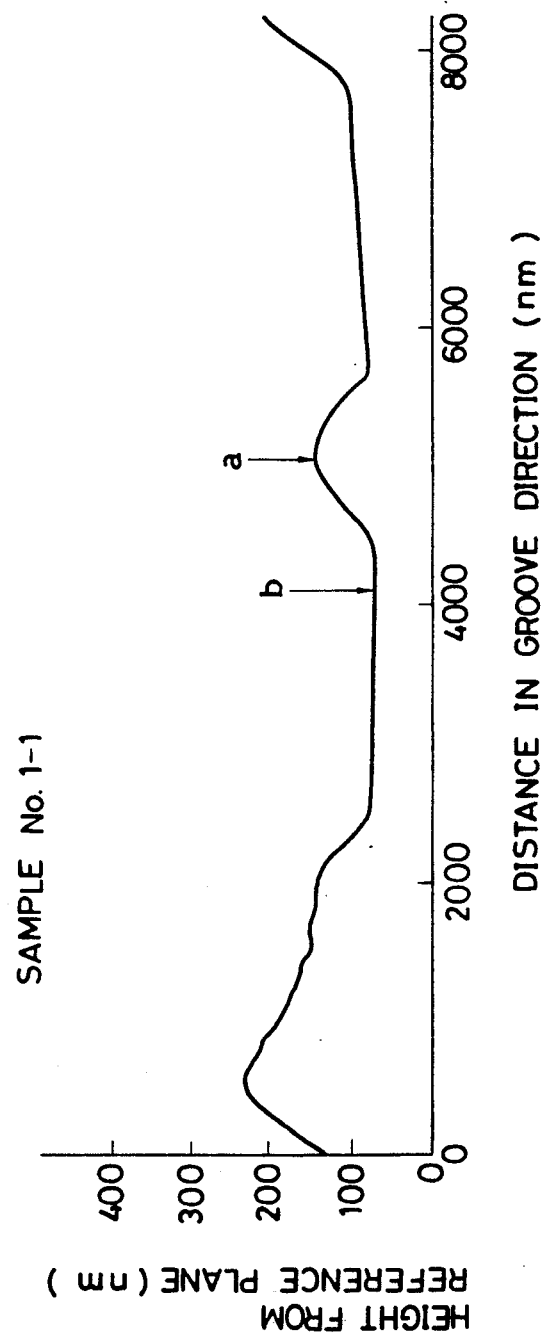
FIGS. 4 and 5 are diagrams showing the surface profile along a groove of the substrate of optical recording disk pieces in Example 1 from which the recording layer has been partially or completely washed away.
Figure 5:
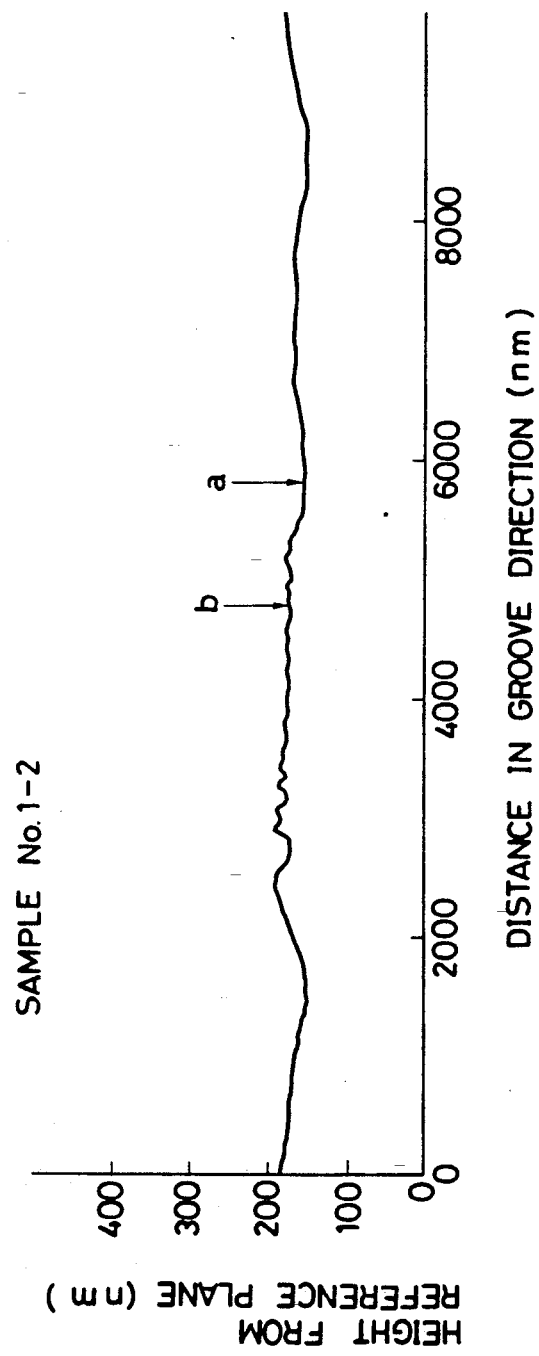

To accurately observe the thickness of the film in the groove, the surface state of the sample was determined in a cross section along the groove. FIGS. 4 and 5 are diagrams showing the surface profile of sample Nos. 1-1 and 1-2, respectively. A height from a reference plane in the substrate thickness direction is on the ordinate and a distance along the groove direction is on the abscissa. In the diagrams, arrow a designates a pit (or a recorded region) and arrow b designates an (unrecorded) region outside the pit.

As seen from FIG. 4, the pit shown by arrow a is raised in sample No. 1-1 subject to mild cleaning. In turn, FIG. 5 shows that the pit shown by arrow a is somewhat depressed in sample No. 1-2 subject to intense cleaning.

The portion appearing raised in the profile of sample No. 1-1 is deemed to result from decomposition of the dyes upon receipt of heat, that is, a decomposed layer consisting essentially of a decomposed product of the dyes having a reduced solubility.

The layer formed along the interface between the substrate and the recording layer at the pit was removed by ultrasonic processing and analyzed to find the presence of decomposed products and the substantial absence of the substrate material.

Additional recording layers were formed using dyes A1 and A2 separately as shown in Table 2.

TABLE 2

| Sample No. | Dye (wt %) | n | k |
| --- | --- | --- | --- |
| 1-3 | A1 (100) | 2.4 | 0.02 |
| 1 | A1 (90) + A2 (10) | 2.4 | 0.10 |

TABLE 2-continued

| Sample No. | Dye (wt %) | n | k |
| --- | --- | --- | --- |
| 1-4 | A2 (100) | 2.3 | 1.35 |

CD signals were recorded in each of the sample disks using a laser beam having a wavelength of 780 nm and a power of 7 mW. Then reproduction was carried out with a commercial CD player.

Although disk sample No. 1 permitted satisfactory reproduction at a high S/N ratio as previously reported, sample No 1-3 was impossible to record due to low absorption of the dye layer and sample No. 1-4 was impossible to reproduce due to low reflection.

EXAMPLE 2

A recording layer containing a dye or dyes was formed on an amorphous polyolefin substrate having a continuous spiral groove and a diameter of 120 mm and a thickness of 1.2 mm. Gold was vacuum deposited on the recording layer to form a reflective layer having a thickness of 1,000 Å. Further, a UV-curable resin composition containing an oligoester acrylate was coated on the reflective layer and UV cured to form a protective layer having a thickness of 50 μm, completing an optical ecording disk sample.

Figure 6:
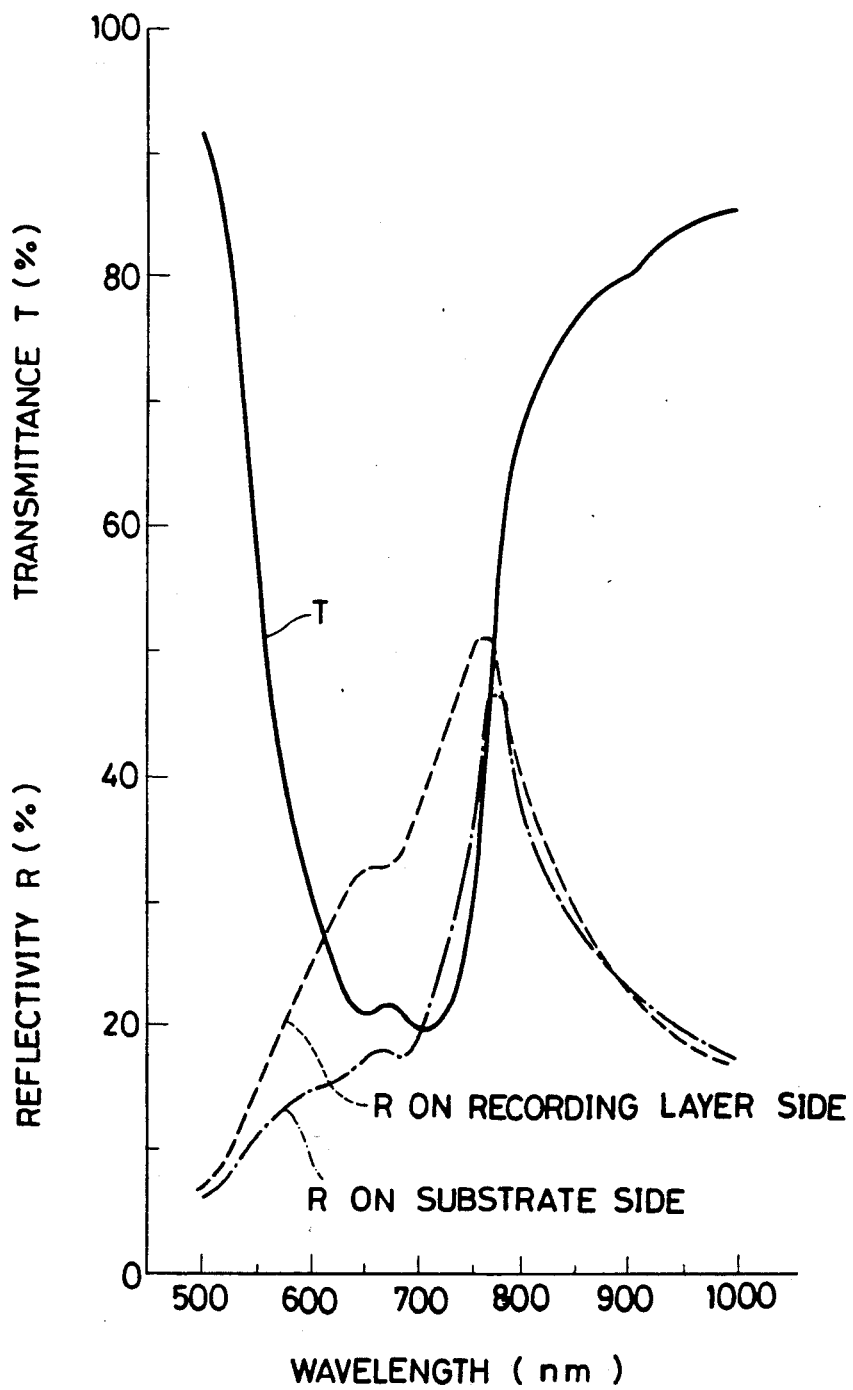
FIGS. 6 and 7 are graphs showing transmission and reflection spectra of dyes B1 and B2 used in the recording layer of Example 2.
Figure 7:
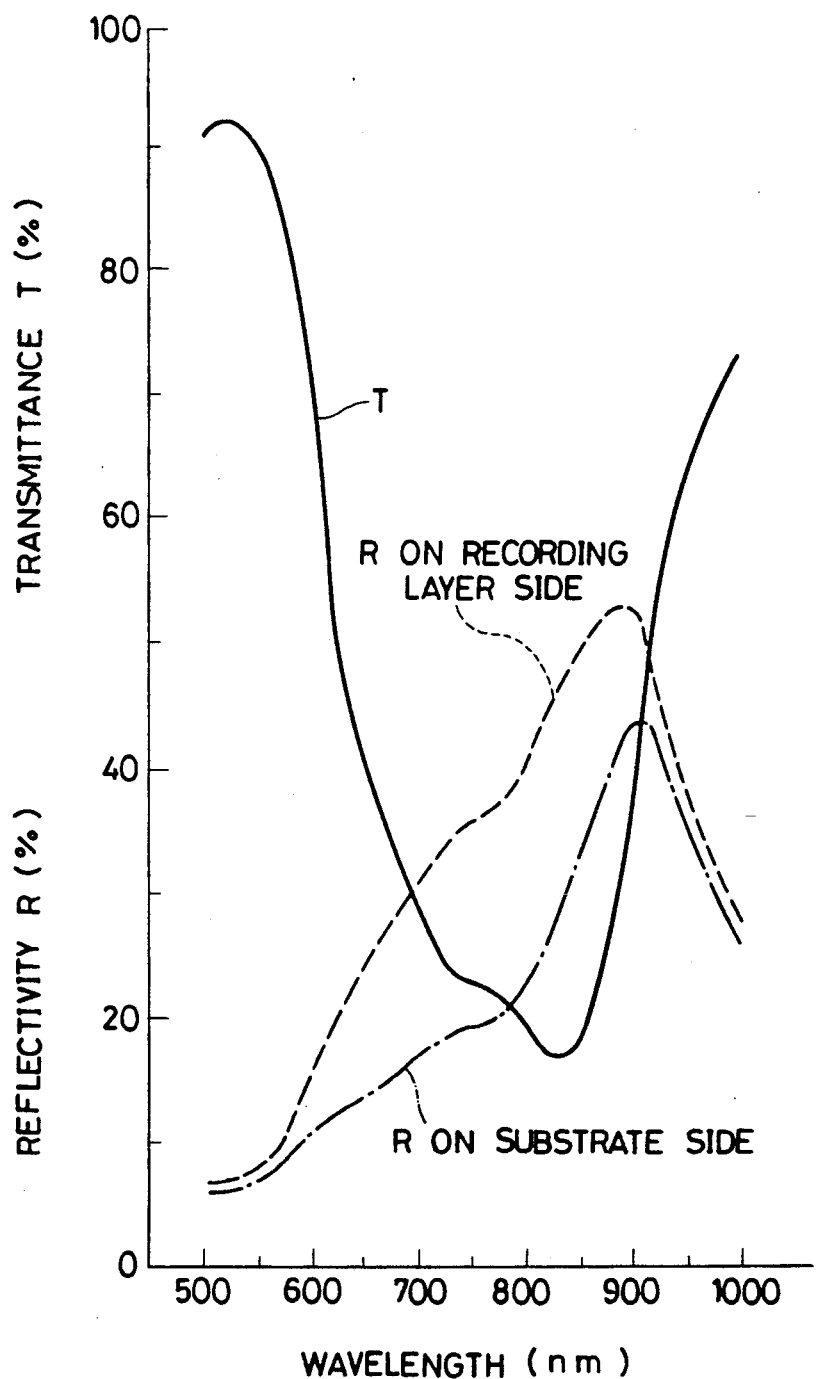

The dyes B1 and B2 used to form the recording layer have the following structural formulae. FIG. 6 shows the transmission and reflection spectra of dye B1. FIG. 7 shows the transmission and reflection spectra of dye B2.

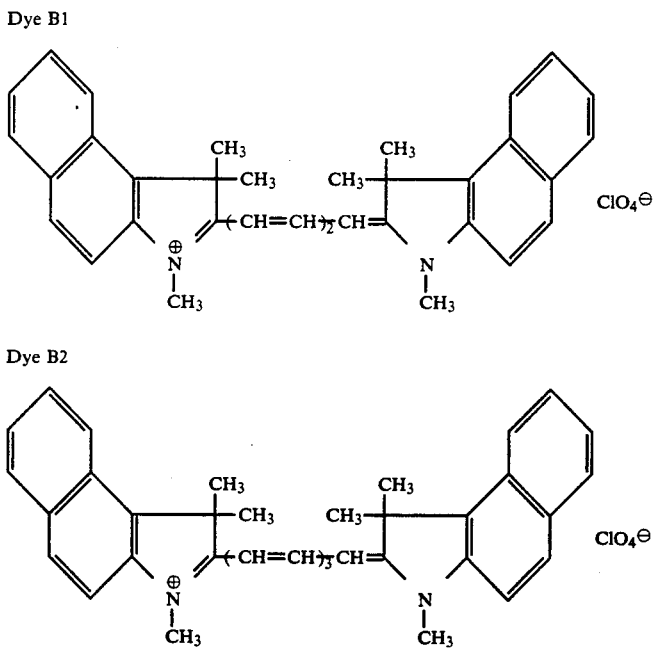

The recording layer was formed by spin coating a coating solution while the substrate was rotated at 500 r.p.m. The coating solution was a 1.5 wt % dichloroethane solution of dye B1 and/or B2. The dye layer was 1,300 Å thick at the end of drying.

The dyes and their proportion in the recording layer are shown in Table 3 together with the index of refraction (n) and coefficient of extinction (k) of the recording layer. In the measurement of n and k of the recording layer, the solvent was dichloroethane and the test substrate was a glass substrate.

TABLE 3

| Sample No. | Dye (wt %) | n | k |
|---|---|---|---|
| 2-1 | B1 (100) | 2.6 | 0.03 |
| 2-2 | B1 (90) + B2 (10) | 2.4 | 0.10 |
| 2-3 | B1 (50) + B2 (50) | 2.0 | 0.75 |
| 2-4 | B2 (100) | 1.9 | 1.15 |

As in Example 1, CD signals were recorded in the sample disks using a laser beam having a wavelength of 780 nm and a power of 7 mW. Then reproduction was carried out with a commercial CD player.

Disk sample No. 2-2 permitted satisfactory reproduction at a high S/N ratio. It was found that the same pits as in Example 1 were formed in this disk sample. In turn, sample No. 2-1 was low in recording sensitivity due to low absorption of the dye layer, and sample Nos. 2-3 and 2-4 were impossible to reproduce due to low reflection.

EXAMPLE 3

There was prepared a polycarbonate substrate having a continuous spiral groove and a diameter of 120 mm and a thickness of 1.2 mm. The groove had a depth of 900 Å and a transverse distance of 0.5 μm while the land had a transverse distance of 1.1 μm.

A recording layer was formed as a dye layer on the substrate from a compatible mixture of 96% by weight of dye C1 and 4% by weight of dye C2.

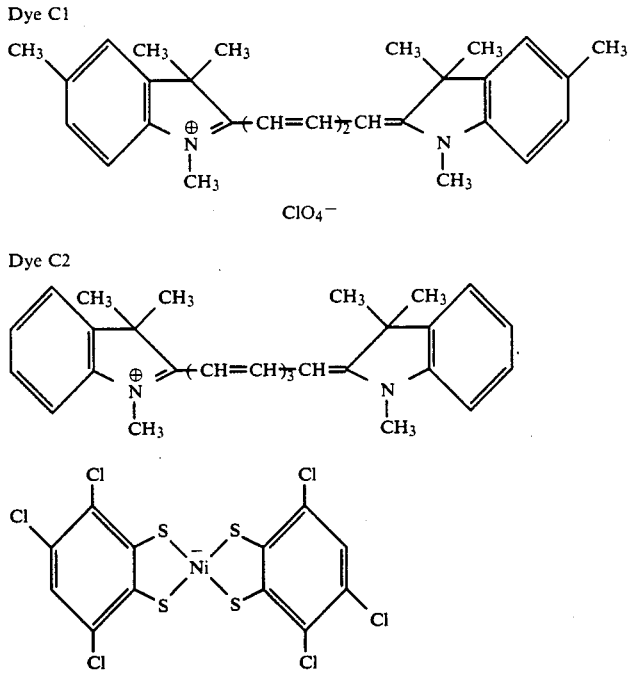

Dye C1

Dye C2

The recording layer was formed by spin coating a coating solution while the substrate was rotated at 500 r.p.m. The coating solution was a 3 wt % cellosolve solution of dyes C1 and C2. At the end of drying, the dye layer was approximately 1,000 Å thick. The thickness of the dye layer was measured by a sectional measurement equipment utilizing a scanning electron microscope, model PMS-1 manufactured by Elionics K. K.

The dye layer has an index of refraction (n) of 2.3 and a coefficient of extinction (k) of 0.08.

Gold was vacuum deposited on the dye layer to form a reflective layer having a thickness of 1,000 Å. Further, a UV-curable resin composition was coated on the reflective layer and UV cured to form a protective layer, completing an optical recording disk sample.

The protective layer was formed by spinner coating a coating composition containing a radiation-curable compound and a photopolymerization sensitizer. That is, the coating composition contained 100 parts by weight of a polyfunctional oligoester acrylate consisting of 30% by weight of trifunctional or more oligoester acrylate and 70% by weight of trimethylpropane acrylate available as Aronix M-8030 from Toa Synthesis K. K. and 5 parts by weight of a photopolymerization sensitizer available as IRGACURE 907 from Japan Ciba Geigy K. K.

The coating was exposed to UV radiation at 120 W/cm for 15 seconds, thereby crosslinking and curing the coating into a cured film having a thickness of 5 μm.

This disk sample is designated sample No. 11.

Disk sample No. 12 was prepared by the same procedure as sample No. 11 except that 100 parts by weight of Aronix M-8030 polyfunctional oligoester acrylate used in the protective coating composition was replaced by a mixture of 50 parts by weight of Aronix M-400 (hexafunctional or more monomer) and 50 parts by weight of Aronix M-309 (trifuctional monomer).

Disk sample No. 13 was prepared by the same procedure as sample No. 11 except that 100 parts by weight of Aronix M-8030 used in the protective coating composition was replaced by a mixture of 50 parts by weight of Aronix M-8030 and 50 parts by weight of Aronix M-111 (monofunctional monomer) and that an adhesive layer was formed between the recording layer and the reflective layer by roll coating a synthetic rubber based hot-melt adhesive HM-1275 (HB Fueller Japan K. K.) to a thickness of 30 μm.

Disk sample No. 14 was prepared by the same procedure as sample No. 11 except that 100 parts by weight of Aronix M-8030 used in the protective coating composition was replaced by a mixture of 50 parts by weight of Aronix M-6100 (difunctional oligoester acrylate) and 50 parts by weight of Aronix M-111 (monofunctional monomer).

CD signals (nine forms of pulses having a frequency in the range of 190 to 720 kHz and a duty factor of 50%) were recorded in the disk samples using a laser beam having a wavelength of 780 nm. The recording power was 7 mW and the linear velocity of the disk during recording was 1.3 m/sec. Recording was made along the groove. Tracking during recording was by push-pull track error control. Then reproduction was carried out with a commercial CD player at a reproduction power of 0.2 mW.

In these disk samples, the unrecorded portion provided a reflectivity of at least 70%. The reflectivity of the recorded portion for 11T pulse CD signals was up to 40% of the reflectivity of the unrecorded portion.

TABLE 4

| Sample No. | Protective layer (pencil hardness) | Jitter (ns) |
| --- | --- | --- |
| 11 | 2H | 100 |
| 12 | 4H | 90 |
| 13 | B | >200 |
| 14 | 4B | >200 |

As seen from Table 4, an increase in hardness of the protective layer results in a significant reduction of jitter.

Disk sample Nos. 11 and 12 were also found to be excellent in weatherability, corrosion resistance, and durability.

EXAMPLE 4

Disk samples were prepared by the same procedure as disk sample No. 11 of Example 3 except that the dyes were changed as shown in Table 5.

Dyes D1 and D2 and a quencher Q1 used herein are shown below.

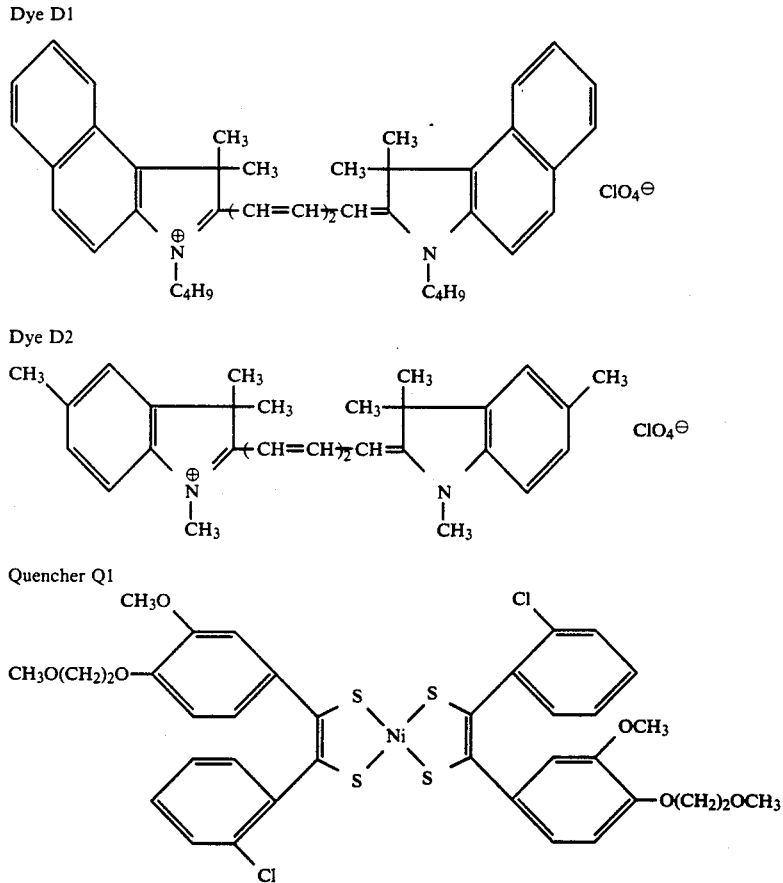

It was found that the same pits as in Example 1 were formed in these disk samples.

Further, the disk samples were measured for jitter using a CD jitter meter MJM-631 manufactured by Meguro K. K. The results are shown in Table 4.

A solution of these dyes and quencher in diacetone alcohol was used to form the recording layer which contained dyes D1 and D2 and quencher Q1 in the amounts shown in Table 5. The index of refraction (n) and coefficient of extinction (k) of the dye layers at 770, 780, and 790 nm were determined as in Example 1.

TABLE 5

| Sample No. | Dye (wt %) | n | | | k | | |
| --- | --- | --- | --- | --- | --- | --- | --- |
| | | 770 nm | 780 nm | 790 nm | 770 nm | 780 nm | 790 nm |
| 31 | D1 (54) + D2 (36) + Q1 (10) | 2.7 | 2.6 | 2.4 | 0.14 | 0.08 | 0.06 |

TABLE 5-continued

| Sample No. | Dye (wt %) | n 770 nm | n 780 nm | n 790 nm | k 770 nm | k 780 nm | k 790 nm |
|---|---|---|---|---|---|---|---|
| 32 | D1 (65) + D2 (35) | 3.0 | 2.9 | 2.9 | 0.18 | 0.08 | 0.04 |
| 33 | D1 (100) | 2.8 | 2.7 | 2.7 | 0.35 | 0.13 | 0.08 |
| 34 | D2 (100) | 2.7 | 2.6 | 2.6 | 0.03 | 0.02 | 0.02 |

As seen from Table 5, mixtures of dyes provide appropriate values of n and k at 770, 780, and 790 nm.

The disk samples were recorded at a wavelength of 780 nm and reproduced at varying wavelengths of 770, 780, and 790 nm in the same manner as in Example 3.

Sample Nos. 31 and 32 permitted satisfactory recording and reproducing operation at all the wavelengths. In these disk samples, the unrecorded portion provided a reflectivity of at least 70%. The reflectivity of the recorded portion for 11T pulse CD signals was up to 40% of the reflectivity of the unrecorded portion. It was found that in these disk samples, the same pits as in Example 1 were formed at the interface between the substrate and the recording layer where signals were recorded.

Sample No. 33 permitted reproduction at 780 and 790 nm, but not at 770 nm. Sample No. 34 failed to record signals.

Next, for each of these disk samples, a disk sample in which the dye layer was thinner than 500 Å in the groove and another disk sample in which the dye layer was thicker than 2,000 Å in the groove were prepared and tested for recording and reproduction by the same procedure as above. It was found that the disk samples having the dye layer having a thickness of less than 500 Å or more than 1,500 Å exhibited a reflectivity of less than 60% in the groove, which was insufficient for reproduction.

EXAMPLE 5

There was prepared an amorphous polyolefin substrate having a continuous spiral groove and a diameter of 120 mm and a thickness of 1.2 mm. The groove had a depth of 1,200 Å and a transverse distance of 0.5 μm while the land had a transverse distance of 1.1 μm. The amorphous polyolefin used was a blend of random copolymers of a cyclic olefin and ethylene. The substrate had an oxygen permeability Q of $0.4 \times 10^{-1} cm^3 \cdot cm^{-2} \cdot s^{-1} \cdot (cmHg)^{-1}$ at 25° C.

A recording layer was formed as a dye layer on the substrate using the following dye E1.

Dye E1

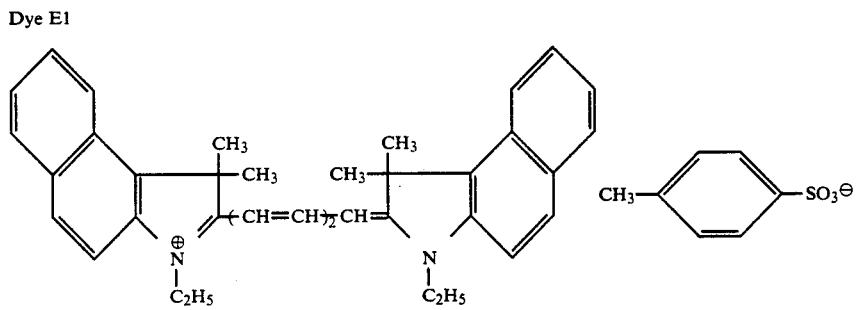

The recording layer was formed by spin coating a coating solution while the substrate was rotated at 500 r.p.m. The coating solution was a 2 wt % cyclohexanone solution of dye E1. At the end of drying, the dye layer was approximately 1,300 Å thick. The thickness of the dye layer was measured by a sectional measurement equipment utilizing a scanning electron microscope, model PMS-1 manufactured by Elionics K. K.

The dye layer had an index of refraction (n) of 2.6 and a coefficient of extinction (k) of 0.1.

Gold was vacuum deposited on the dye layer to form a reflective layer having a thickness of 1,000 Å. Further, a UV-curable resin composition was coated on the reflective layer and UV cured to form a protective layer, completing an optical recording disk sample.

The protective layer was formed by spinner coating the same coating composition containing a radiation-curable compound and a photopolymerization sensitizer as used in Example 2, No. 11. The coating was exposed to UV radiation at 120 W/cm for 15 seconds, thereby crosslinking and curing the coating into a cured film having a thickness of 5 μm.

This disk sample is designated sample No. 41.

Disk sample No. 42 was prepared by the same procedure as sample No. 41 except that polycarbonate was used as the substrate and the coating solution to form the dye layer was a 3 wt% ethyl cellosolve solution of dye E1. The polycarbonate substrate had an oxygen permeability Q of $25 \times 10^{-10} cm^3 \cdot cm^{-2} \cdot s^{-1} \cdot (cmHg)^{-1}$ at 25° C.

Disk sample Nos. 43 and 44 were prepared by the same procedure as sample Nos. 41 and 42, respectively, except that 10% by weight of quencher Q2 was added to dye E1.

Quencher Q2

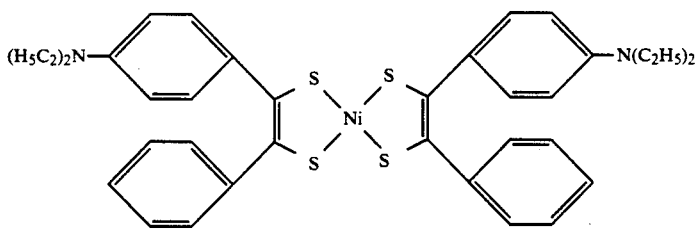

Figure 8:
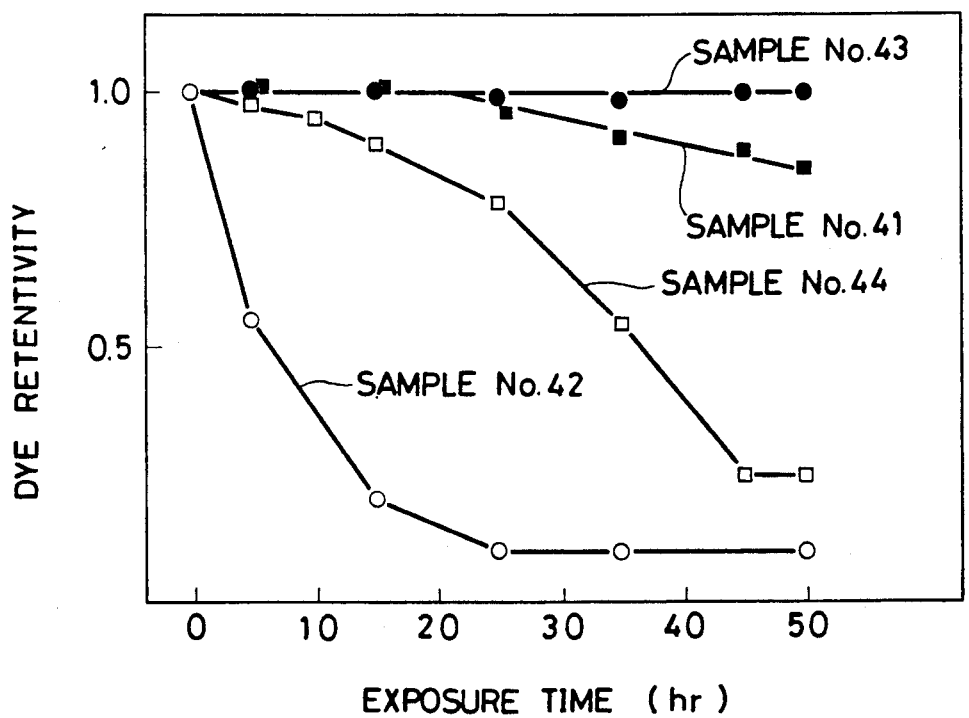
FIG. 8 is a diagram showing the light resistance of several samples.

These disk samples, Nos. 41 to 44, were exposed to a 1.5-kilowatt Xe lamp at a spacing of 20 cm through the substrate. The retentivity of the dye was plotted relative to exposure time. The retentivity of the dye is given by $(100-R)/(100-R0)$ wherein R0 is an initial reflectivity and R is a reflectivity after exposure, both at 780 nm. The results are shown in FIG. 8. Sample No. 43 (amorphous polyolefin substrate, dye/quencher recording layer) showed fully improved light resistance, and sample No. 41 (amorphous polyolefin substrate, dye recording layer) showed significantly improved light resistance irrespective of the absence of a quencher.

It was found in all these disk samples that pits similar to those in Example 1 was formed and that recording-/reproducing operation was satisfactory.

EXAMPLE 6

There was prepared an amorphous polyolefin substrate having a continuous spiral groove and a diameter of 120 mm and a thickness of 1.2 mm. The groove had a depth of 800 Å and a transverse distance of 0.4 μm while the land had a transverse distance of 1.2 μm.

A recording layer was formed as a dye layer on the substrate by vacuum depositing dyes F1 to F3 in the form of a phthalocyanine dye having a central metal M.

| Dye | M |
|-----|---|
| F1 | $Si[OSi(CH_3)_3]_2$ |
| F2 | Cu |
| F3 | $RuCl_2$ |

Vacuum deposition of the dye was carried out by a resistance heating technique under conditions: an operating pressure of $1 \times 10^{-5}$ Torr, a substrate temperature of 20° C., and a deposition rate of 600 Å/min. The deposited dye layer was 1,200 Å thick in the groove. The thickness of the dye layer was measured by a sectional measurement equipment utilizing a scanning electron microscope, model PMS 1 manufactured by Elionics K. K.

The index of refraction (n) and the coefficient of extinction (k) of the dye layer at 780 nm are shown in Table 6.

An optical recording disk sample was completed by following the procedure of Example 5. That is, gold was vacuum deposited on the dye layer to form a reflective layer having a thickness of 1,000 Å. A UV-curable resin composition was coated on the reflective layer and UV cured to form a protective layer having a thickness of 5 μm.

These disk samples are designated sample Nos. 51, 52, and 53.

CD signals (nine forms of pulses having a frequency in the range of 190 to 720 kHz and a duty factor of 50%) were recorded in the disk samples using a laser beam having a wavelength of 780 nm. The recording power was 10 mW and the linear velocity of the disk during recording was 1.3 m/sec. Recording was made along the groove. Tracking during recording was by push-.pull track error control. Then reproduction was carried out with a commercial CD player at a reproduction power of 0.2 mW.

In these disk samples, the reflectivity (%) of the unrecorded portion was measured. The proportion (%) of the reflectivity of the recorded portion for 11T pulse CD signals relative to the reflectivity of the unrecorded portion was also determined.

The results are shown in Table 6.

TABLE 6

| Sample No. | Dye | n | k | Forming method | Reflectivity (%) Unrecorded portion | Rec./Unrec. |
|---|---|---|---|---|---|---|
| 51 | F1 | 2.4 | 0.04 | VD | 78 | 38 |
| 52 | F2 | 2.5 | 0.08 | VD | 74 | 37 |
| 53 | F3 | 2.8 | 0.16 | VD | 76 | 40 |

VD: vacuum deposition

It was found that the same pits as in Example 1 were formed in these disk samples and jitter was low enough.

EXAMPLE 7

In disk sample No. 11 of Example 3, a jitter preventing film was formed on or below the reflective layer as shown in Table 7.

TABLE 7

| Sample No. | Jitter preventing film Below reflective layer | On reflective layer |
|---|---|---|
| 61 | — | A |
| 62 | — | B |
| 63 | C | — |
| 64 | D | D |
| 65 | — | E |
| 66 | — | F |
| 67 | G | — |
| 68 | H | H |

| Jitter preventing film A | |
|---|---|
| Plasma-polymerized film | |
| Monomer gas: tetramethoxysilane | 205 cm³ |
| Carrier gas: Ar | 55 cm³ |
| Operating pressure | 0.07 Torr |
| Power | 250 W |
| Frequency | 13.56 MHz |
| Film thickness | 0.5 μm |
| Jitter preventing film B | |
| Plasma-polymerized film | |
| Monomer gas: methyl methacrylate | 205 cm³ |
| Carrier gas: Ar | 55 cm³ |
| Operating pressure | 0.05 Torr |
| Power | 250 W |
| Frequency | 13.56 MHz |
| Film thickness | 2 μm |
| Jitter preventing film C | |
| Plasma-polymerized film | |
| Monomer gas: tetramethoxysilane | 205 cm³ |

TABLE 7-continued

| | |
|---|---|
| Carrier gas: Ar | 5 cm$^3$ |
| Operating pressure | 0.05 Torr |
| Power | 250 W |
| Frequency | 13.56 MHz |
| Film thickness | 0.3 μm |
| Jitter preventing film D | |
| Plasma-polymerized film | |
| Monomer gas: triethylsilane | 205 cm$^3$ |
| Carrier gas: Ar | 5 cm$^3$ |
| Operating pressure | 0.06 Torr |
| Power | 250 W |
| Frequency | 13.56 MHz |
| Film thickness | 0.5 μm |
| Jitter preventing film E | |
| Sputtered film of SiO$_2$ | 0.5 μm |
| Film thickness | |
| Jitter preventing film F | |
| Sputtered film of TiO$_2$ | 0.3 μm |
| Film thickness | |
| Jitter preventing film G | |
| Sputtered film of WO$_3$ | 0.3 μm |
| Film thickness | |
| Jitter preventing film H | |
| Sputtered film of SiAlON | 0.5 μm |
| Film thickness | |

It is to be noted that the film thickness was measured using an ellipsometer.

All disk samples, Nos. 61 to 68, showed a reduced jitter.

EXAMPLE 8

In disk sample No. 11 of Example 3, an adhesive layer was formed between the recording layer and the reflective layer. The adhesive layers used herein are adhesive layer Nos. 1 to 4 defined below.

Adhesive layer No. 1

Ethyl acetate and ethyl alcohol were mixed in a ratio of 10:11. With stirring, Si(OC$_2$H$_5$)$_4$ was added to the mixture in a ratio of tetraethoxysilane to ethyl acetate of 2/25. The solution was allowed to stand for 3 or 4 days and then diluted with n-propanol by a factor of 10 to form a coating solution. The solution was spin coated onto the dye layer and dried for 30 minutes at 60° C.

Adhesive layer No. 2

Compound T14 was diluted with a 1:1 mixture of isopropanol and water by a factor of 30. The solution was spin coated onto the dye layer and dried.

Adhesive layer No. 3

Ethylacetoacetate aluminum diisopropylate was diluted with a 3:1 mixture of isopropanol and water by a factor of 30. The solution was spin coated onto the dye layer and dried.

Adhesive layer No. 4

Zirconium tetraethylacetoacetate was synthesized by reacting 1 mol of zirconiun oxychloride with 4 mol of ethyl acetoacetate in the presence of sodium carbonate and diluted with n-propanol to form a 2% n-propanol solution. The solution was spin coated onto the dye layer and dried.

Each of the adhesive layers had a thickness of 50 Å after drying.

These disk samples were tested by attaching adhesive tape onto the protective layer and then peeling off the tape. Separation of the reflective layer occurred in the samples without the adhesive layer, but no separation occurred in the samples having the adhesive layer.

EXAMPLE 9

There was prepared a polycarbonate substrate having a continuous spiral groove and a diameter of 120 mm and a thickness of 1.2 mm. A recording layer was formed on the substrate. Gold was vacuum deposited on the recording layer to form a reflective layer having a thickness of 1,000 Å. Further, a UV-curable oligoester acrylate resin composition was coated on the reflective layer and UV cured to form a protective layer of 10 μm thick, completing an optical recording disk sample.

The recording layers used herein were Nos. 71, 72 and 73 identified in Table 8. It is to be noted that dyes A1 and A2 are as defined in Example 1.

TABLE 8

| | Recording layer | | |
|---|---|---|---|
| | No. 71 | No. 72 | No. 73 |
| Composition (% by weight) | | | |
| Light-absorbing dye A1 | 10 | 9 | 8 |
| Light-absorbing dye A2 | 90 | 81 | 72 |
| Fast Brown RR | — | 10 | 10 |
| Quencher Q3 | — | — | 10 |
| Properties | | | |
| n (@ 780 nm) | 2.5 | 2.4 | 2.4 |
| k (@ 780 nm) | 0.10 | 0.10 | 0.15 |

Fast Brown RR (λmax 45? nm)

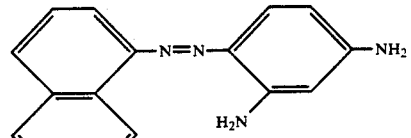

Quencher Q3 (λmax 870 nm)

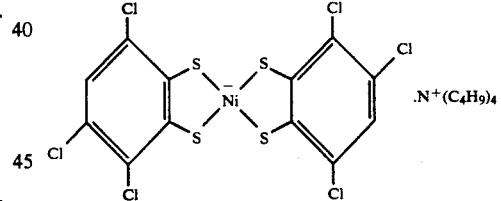

The recording layer was formed by spin coating a coating solution while the substrate was rotated at 500 r.p.m. The coating solution was a 1.5 wt % dichloroethane solution of dyes A1 and A2 with or without the quencher. At the end of drying, the dye layer was 1,300 Å thick in the groove. The index of refraction (n) and the coefficient of extinction (k) of the dye layer were also reported in Table 8.

CD signals were recorded in the disk samples using a laser beam having a wavelength of 780 nm and a power of 7 mW. Then reproduction was carried out with a commercial CD player. Satisfactory reproduction could be made at a high S/N ratio.

These disk samples were exposed to a xenon lamp through the substrate for 20 hours. The retentivity of the dye is given by (100−R)/(100−R0) wherein R0 is an initial reflectivity and R is a reflectivity after 20-hour exposure, both at 780 nm. This is a measure of light fading resistance. The results are shown in Table 9.

TABLE 9

| Recording layer No. | Light resistance (100 − R)/(100 − R0) |
| --- | --- |
| 71 | 0.14 |
| 72 | 0.77 |
| 73 | 0.90 |

There has been described an optical recording medium meeting the CD standard. The recording layer exhibits a high reflectivity in unrecorded conditions, but a substantial drop of reflectivity occurs when pits are formed therein, so that reproduction based on the CD standard is possible. The pits have a well-defined shape. Recording and reproducing operation can be carried out at a high S/N ratio.

Obviously many variations and modifications of the present invention are possible in the light of the above teachings. It is therefore to be understood that within the scope of the appended claims, the invention may be practiced otherwise than as specifically described.

We claim:

1. An optical recording medium comprising a substrate of resinous material, a recording layer of a dye-containing recording material on the substrate, and a reflective layer and a protective layer disposed on the recording layer in a close contact relationship, wherein recording is carried out by directing recording light to the recording layer through the substrate to form a pit in the recording layer and reproduction is carried out by directing reproducing light to the pit through the substrate, the recording layer has a coefficient of extinction k of up to 0.15 and index of refraction n of at least 1.8 at a wavelength of the recording and reproducing light in the range of from 700 to 900 nm, a layer containing a decomposition product of the recording material, but substantially free of the substrate material is present at the interface between said substrate and said recording layer where the pit is formed, an unrecorded portion of the recording layer where no pit is formed provides a reflectivity of at least 60% and a recorded portion of the recording layer where pits are formed provides a reflectivity of up to 40% of that of the unrecorded portion when the reproducing light is directed to the pit form the substrate side.

2. The optical recording medium of claim 1 wherein a space is formed at the interface between the pit in the recording layer and the overlying reflective layer.

3. The optical recording medium of claim 1 wherein the recording layer has a thickness of 500 to 1,500 Å where the recording light is directed thereto.

4. The optical recording medium of claim 1 wherein said recording layer is a coated layer.

5. The optical recording medium of claim 1 wherein said recording layer is a deposited layer.

6. The optical recording medium of claim 1 wherein the recording material contains at least two dyes.

7. The optical recording medium of claim 1 wherein said protective layer is formed by radiation curing a radiation-curable compound.

8. The optical recording medium of claim 7 wherein said protective layer has a pencil hardness of H to 8H at 25° C.

9. The optical recording medium of claim 7 wherein said protective layer has a thickness of at least 0.1 μm.

10. The optical recording medium of claim 7, wherein said dye is a cyanide dye.

11. The optical recording medium of claim 1 wherein the substrate has an oxygen permeability of up to $5 \times 10^{-10} cm^3 \cdot cm^{-2} \cdot s^{-1} \cdot (cmHg)^{-1}$ at 25° C.

* * * * *